(12) United States Patent
Li et al.

(10) Patent No.: US 9,862,638 B2
(45) Date of Patent: Jan. 9, 2018

(54) METHODS TO MAKE GLASS COMPOSITIONS AND FIBERS MADE THEREFROM

(71) Applicant: PPG Industries Ohio, Inc., Cleveland, OH (US)

(72) Inventors: Hong Li, Sewickley, PA (US); James C. Watson, Lake Wylie, SC (US)

(*) Notice: Subject to any disclaimer, the term of this patent is extended or adjusted under 35 U.S.C. 154(b) by 0 days.

(21) Appl. No.: 15/397,320

(22) Filed: Jan. 3, 2017

(65) Prior Publication Data

US 2017/0113964 A1    Apr. 27, 2017

Related U.S. Application Data

(62) Division of application No. 12/534,490, filed on Aug. 3, 2009, now Pat. No. 9,556,059.

(51) Int. Cl.

| | |
|---|---|
| *C03C 3/085* | (2006.01) |
| *C08K 3/22* | (2006.01) |
| *C03C 13/00* | (2006.01) |
| *C03C 3/087* | (2006.01) |
| *C03C 13/06* | (2006.01) |
| *C08J 5/04* | (2006.01) |
| *C03C 3/112* | (2006.01) |
| *C03C 3/095* | (2006.01) |
| *C03C 4/20* | (2006.01) |
| *C03B 37/01* | (2006.01) |

(52) U.S. Cl.
CPC .............. *C03C 13/06* (2013.01); *C03B 37/01* (2013.01); *C03C 3/087* (2013.01); *C03C 3/095* (2013.01); *C03C 3/112* (2013.01); *C03C 4/20* (2013.01); *C03C 2204/00* (2013.01); *C03C 2213/00* (2013.01)

(58) Field of Classification Search
CPC ......... C03C 13/06; C03C 13/00; C03C 3/087; C03C 3/095; C03C 3/112
See application file for complete search history.

(56) References Cited

U.S. PATENT DOCUMENTS

| | | | |
|---|---|---|---|
| 2,467,889 A | 4/1949 | Harter et al. | |
| 2,576,312 A | 11/1951 | Minnick | |
| 3,007,806 A | 11/1961 | Hartwig | |
| 3,008,841 A | 11/1961 | Tiede et al. | |
| 3,945,838 A | 3/1976 | Erickson et al. | |
| 3,985,935 A | 10/1976 | Brodmann et al. | |

(Continued)

FOREIGN PATENT DOCUMENTS

| | | |
|---|---|---|
| BE | 849501 | 4/1977 |
| CN | 1196002 | 4/2005 |

(Continued)

OTHER PUBLICATIONS

Notice of Allowance dated Oct. 21, 2016 in U.S. Appl. No. 13/365,590, filed Feb. 3, 2012. 11 pages.

(Continued)

*Primary Examiner* — Shuangyi Abu Ali
(74) *Attorney, Agent, or Firm* — Kilpatrick Townsend & Stockton LLP

(57) ABSTRACT

Embodiments of the present invention provides fiberizable glass compositions formed from batch compositions comprising significant amounts of one or more glassy minerals, including perlite and/or pumice.

16 Claims, 9 Drawing Sheets

(56) References Cited

U.S. PATENT DOCUMENTS

| | | | |
|---|---|---|---|
| 4,026,715 A | 5/1977 | Erickson et al. | |
| 4,055,434 A | 10/1977 | Chen et al. | |
| 4,062,667 A * | 12/1977 | Hatanaka | C03B 5/00 |
| | | | 65/135.1 |
| 4,087,285 A | 5/1978 | Kurz et al. | |
| 4,094,689 A * | 6/1978 | van Ass | C03C 3/062 |
| | | | 385/141 |
| 4,095,986 A | 6/1978 | Matsuda et al. | |
| 4,140,533 A | 2/1979 | Ohtomo et al. | |
| 4,233,379 A | 11/1980 | Gross et al. | |
| 4,249,991 A | 2/1981 | Baes et al. | |
| 4,366,251 A | 12/1982 | Rapp et al. | |
| 4,495,298 A | 1/1985 | Yamagishi et al. | |
| 4,557,973 A | 12/1985 | Ali et al. | |
| 4,764,487 A | 8/1988 | Lewis | |
| 4,867,779 A | 9/1989 | Meunier et al. | |
| 4,920,080 A | 4/1990 | Demarest, Jr. | |
| 5,037,470 A | 8/1991 | Matzen et al. | |
| 5,064,780 A | 11/1991 | Grijol et al. | |
| 5,420,082 A | 5/1995 | Maugendre et al. | |
| 5,420,282 A | 5/1995 | Brooks et al. | |
| 5,641,347 A | 6/1997 | Grabowski et al. | |
| 5,658,836 A | 8/1997 | Rapp et al. | |
| 5,691,255 A | 11/1997 | Jensen et al. | |
| 5,714,421 A | 2/1998 | Olds et al. | |
| 5,843,854 A | 12/1998 | Karppinen et al. | |
| 5,932,499 A | 8/1999 | Xu et al. | |
| 6,060,413 A | 5/2000 | Bernard et al. | |
| 6,077,798 A | 6/2000 | Rapp | |
| 6,128,430 A | 10/2000 | Chu et al. | |
| 6,264,961 B1 | 7/2001 | Ansmann | |
| 6,265,335 B1 | 7/2001 | Oleske et al. | |
| 6,284,684 B1 | 9/2001 | Vignesoult et al. | |
| 6,297,182 B1 | 10/2001 | Maeda et al. | |
| 6,346,568 B1 | 2/2002 | Maeda et al. | |
| 6,624,103 B2 | 9/2003 | Jantzen et al. | |
| 6,630,419 B2 | 10/2003 | Jantzen et al. | |
| 6,809,050 B1 | 10/2004 | McGinnis | |
| 6,812,174 B2 | 11/2004 | Jantzen et al. | |
| 6,897,173 B2 | 5/2005 | Bernard et al. | |
| 6,933,045 B2 | 8/2005 | Tamura | |
| 7,160,824 B2 | 1/2007 | Zguris et al. | |
| 7,309,671 B2 | 12/2007 | Kurachi et al. | |
| 7,449,419 B2 | 11/2008 | Li et al. | |
| 7,709,027 B2 | 5/2010 | Fechner et al. | |
| 7,795,163 B2 | 9/2010 | Striegler et al. | |
| 8,025,665 B2 | 9/2011 | Lim et al. | |
| 8,828,897 B2 | 9/2014 | Fechner et al. | |
| 2005/0009428 A1 | 1/2005 | Porter et al. | |
| 2005/0079970 A1 | 4/2005 | Otaki et al. | |
| 2005/0107238 A1 | 5/2005 | Li et al. | |
| 2006/0165968 A1 | 7/2006 | Tanaka et al. | |
| 2007/0087139 A1 | 4/2007 | Creux et al. | |
| 2007/0220922 A1 | 9/2007 | Bauer et al. | |
| 2007/0225145 A1 | 9/2007 | Bauer et al. | |
| 2007/0243995 A1 | 10/2007 | Dallies et al. | |
| 2007/0251275 A1 | 11/2007 | Bauer et al. | |
| 2007/0287624 A1* | 12/2007 | Bauer | C03C 1/02 |
| | | | 501/27 |
| 2008/0139375 A1 | 6/2008 | Wennemann et al. | |
| 2008/0242527 A1 | 10/2008 | Otaki et al. | |
| 2009/0042030 A1 | 2/2009 | Douce et al. | |
| 2010/0116179 A1 | 5/2010 | Baker et al. | |
| 2010/0184345 A1 | 7/2010 | Lalande et al. | |
| 2010/0248928 A1 | 9/2010 | Berthereau et al. | |
| 2010/0256768 A1 | 10/2010 | Lim et al. | |
| 2011/0028606 A1 | 2/2011 | Li et al. | |
| 2012/0172190 A1 | 7/2012 | Li et al. | |
| 2013/0059716 A1 | 3/2013 | Fechner et al. | |

FOREIGN PATENT DOCUMENTS

| | | |
|---|---|---|
| CN | 101580344 | 11/2009 |
| CN | 101691278 | 4/2010 |
| DE | 293105 A5 | 8/1991 |
| DE | 40 32 460 A1 | 6/1992 |
| EP | 0414110 | 2/1992 |
| EP | 1265821 | 12/2004 |
| GB | 1548776 | 7/1979 |
| GB | 2220654 | 1/1990 |
| JP | 57-017444 | 1/1962 |
| JP | 49017813 | 2/1974 |
| JP | 60077145 | 5/1985 |
| JP | 11-029344 | 2/1999 |
| JP | 11-043346 | 2/1999 |
| JP | 11-180727 | 7/1999 |
| JP | 2000-203874 | 7/2000 |
| JP | 2001-026701 | 1/2001 |
| JP | 2004/043295 | 2/2004 |
| JP | 2005-324992 | 11/2005 |
| JP | 2009/513474 | 4/2009 |
| RU | 2180317 | 3/2002 |
| RU | 2232729 | 7/2004 |
| RU | 2263639 | 11/2005 |
| RU | 2007/126843 | 1/2009 |
| SU | 292909 | 1/1971 |
| SU | 418456 | 3/1974 |
| SU | 418456 * | 9/1974 |
| WO | 2001/0146078 | 6/2001 |
| WO | 2003/018499 | 3/2003 |
| WO | 2004/110944 | 12/2004 |
| WO | 2006/090030 | 8/2006 |
| WO | 2006/103377 | 10/2006 |
| WO | 2007/050529 | 5/2007 |
| WO | 2006/113379 | 10/2008 |
| WO | 2009/056768 | 5/2009 |
| WO | 2008/42347 | 11/2009 |
| WO | 2011/017343 | 2/2011 |
| WO | 2011/035889 | 3/2011 |
| WO | 2012/001448 | 1/2012 |
| WO | 2012/001449 | 1/2012 |

OTHER PUBLICATIONS

Notice of Allowance dated May 24, 2016 in U.S. Appl. No. 13/756,603, filed Feb. 1, 2013. 8 pages.

Office Action translation dated Dec. 21, 2016 in Russian Patent Application No. 2014135793 filed Feb. 1, 2013. 6 pages.

Third Office Action translation dated Jan. 16, 2017 in Chinese Patent Application No. 201380013694.6 filed Feb. 1, 2013. 10 pages.

Final Office Action dated Jan. 30, 2017 in Japanese Patent Application No. 2015-36551 filed Aug. 3, 2010. 2 pages.

Office Action dated Feb. 16, 2017 in Mexican Patent Application No. MX/a/2012/001462 filed Aug. 3, 2010. 4 pages.

1999 Material-Related Intellectual Infrastructure Development Entrustment, Entrustment Intellectual Infrastructure Development Results Report, Database Establishment Contributing to Design of New Glass, Glass Composition-Physical Properties Data Edition, Mar. 2001, Corporation Juridical Person, New Glass Forum.

Database WPI Week 1999154, Thomson Scientific, London, GB, XP002663282,, Feb. 2, 1999 abstract.

Database WPI Week 200237, Thomson Scientific, London, GB AN 2002-337430, XP002663284, Mar. 10, 2002, abstract.

Database WPI, Week 198210, Thomson Scientific, London, GB; AN 1982-18554E, XP002663283, Jan. 29, 1982, abstract.

Amendment and Response to Office Action in U.S. Appl. 12/365,590 dated Jul. 29, 2016.

Non-Final Office Action dated Mar. 29, 2016 in U.S. Appl. No. 13/365,590, filed Feb. 3, 2014. 15 pages.

Final Office Action dated Nov. 24, 2015 in U.S. Appl. 13/365,590, filed Feb. 3, 2012. 12 pages.

Amendment and Response to Office Action in U.S. Appl. No. 12/365,590 dated Oct. 1, 2015.

Non-Final Office Action dated Jul. 1, 2015 in U.S. Appl. No. 13/365,590, filed Feb. 3, 2014. 8 pages.

Request for Continued Examination to Office Action in U.S. Appl. No. 13/36,590 dated Jun. 3, 2015.

(56) References Cited

OTHER PUBLICATIONS

Amendment and Response to Final Office Action and Request for Consideration After Final Pilot Program in U.S. Appl. No. 13/365,590 dated Apr. 30, 2015.
Final Office Action dated Feb. 4, 2015 in U.S. Appl. No. 13/365,590, filed Feb. 3, 2012. 9 pages.
Amendment and Response to Office Action in U.S. Appl. No. 12/365,590 dated Dec. 2, 2014.
Non-Final Office Action dated Sep. 2, 2014 in U.S. Appl. No. 13/365,590, filed Feb. 3, 2014. 12 pages.
Request for Continued Examination to Office Action in U.S. Appl. No. 13/36,590 dated Aug. 13, 2014.
Non-Final Office Action dated May 13, 2014 in U.S. Appl. No. 13/365,590, filed Feb. 3, 2012. 10 pages.
Amendment and Response to Office Action in U.S. Appl. No. 12/365,590 dated Apr. 10, 2014.
Non-Final Office Action dated Jan. 10, 2014 in U.S. Appl. No. 13/365,590, filed Feb. 3, 2012. 10 pages.
Request for Continued Examination to Office Action in U.S. Appl. No. 13/756,603 dated Apr. 19, 2016.
Advisory Office Action dated Mar. 30, 2016 in U.S. Appl. No. 13/756,603, filed Feb. 1, 2013.
Amendment and Response to Office Action in U.S. Appl. No. 13/756,603 dated Mar. 22, 2016.
Final Office Action dated Dec. 22, 2015 in U.S. Appl. No. 13/756,603, filed Feb. 1, 2013. 7 pages.
Amendment and Response to Office Action in U.S. Appl. No. 13/756,603 dated Nov. 19, 2015.
Non-Final Office Action dated Aug. 20, 2015 in U.S. Appl. No. 13/756,603, filed Feb. 1, 2013. 10 pages.
Request for Continued Examination to Office Action in U.S. Appl. No. 13/756,603 dated Jul. 28, 2015.
Final Office Action dated Apr. 29, 2015 in U.S. Appl. No. 13/756,603, filed Feb. 1, 2013. 7 pages.
Amendment and Response to Office Action in U.S. Appl. No. 13/756,603 dated Mar. 26, 2015.
Non-Final Office Action dated Dec. 31, 2014 in U.S. Appl. No. 13/756,603, filed Feb. 1, 2013. 9 pages.
Balandina et al., "Study of the Possibility of Using Stripping Rocks for Manufacturing Ceramic Tiles," Promyshlennost Stroitel'nykh materialov, Seriya 5: Keramicheskaya Promyshlennost, 8, 1980, pp. 27-29.
CN201380013694.6 , "Office Action," dated Jan. 4, 2016. 18 pages.
Pre-Appeal Examination Report dated Feb. 10, 2016 in Japanese Patent Application No. 2012-523706 filed X . 2 pages.
JP2012-523706 , "Office Action", dated Feb. 10, 2016.
JP2015-36551 , "Office Action", dated Jul. 15, 2016. 3 pages.
Levitski, I. et al., "Colored Nonfritted Glazes From Available Raw Materials for Facade Ceramics," Glass and Ceramics, vol. 52, No. 1-2, 1995, pp. 20-23.
Loewenstein, K. et al., The Manufacturing Technology of Continuous Glass Fibers (Glass Science and Technology) , third, Completely Revised Edition, 1993, pp. 30-36.
Melkonyan , R. "Perlite Rocks of Armenia as Valuable Raw Materials," Gornyi Zhurnal, 2, GOZHA6, ISSN: 0017-2278, 2003, pp. 40-43.
PCT/US2010/044275, "International Preliminary Report on Patentability," dated Feb. 16, 2012. 14 pages.
PCT/US2010/044275, "International Search Report and Written Opinion," dated Nov. 28, 2011. 16 pages.
PCT/US2013/024271 , "International Preliminary Report on Patentability," dated Feb. 3, 2012. 5 pages.
PCT/US2013/024271 , "International Search Report and Written Opinion," dated Jun. 13, 2013. 7 pages.
Roustambekyan, S. et al. "Low Alkali Glass Fiber Produced from Pumice and Perlites," Promyshlennost Armenii, 9, 1972, pp. 42-43.
Simova, V. et al., "New Composition of Glass-Fibers for Hydroinsulation Containing Manganese Oxide", Stoitelni Materiali I Silikatna Prornishlenost, 7(3), 1966, pp. 27-29.
Wallenberger, F. et al., Glass Fibers, In ASM Handbook, vol. 21-Compositions (06781G), 2001, pp. 1-9.
Xiao, L. et al., "Influence of Materials on Polymer Cement Concrete Fiber Composite Plate," Jilin Jianzhu Gongcheng Xueyuan Xuebao, 23(2), 2006, pp. 1-6.
Notice of Allowance dated Oct. 5, 2016 in U.S. Appl. No. 12/534,490, filed Aug. 3, 2009. 6 pages.

\* cited by examiner

Weibull Parameter Estimates same as Extreme-Value with a=exp(?), ß=1/d

| Parameter | Estimate | Lower 95% | Upper 95% | Number failed |
|---|---|---|---|---|
| a | 3125.9396 | 3087.6973 | 3163.0663 | 57 |
| ß | 23.10284 | 18.517975 | 28.270664 | 57 |

Summary

| Group | Number failed | Number censored | Mean | Std Error |
|---|---|---|---|---|
| Combined | 57 | 0 | 3050.74 | 22.3631 |

METHODS TO MAKE GLASS COMPOSITIONS AND FIBERS MADE THEREFROM

CROSS-REFERENCE TO RELATED APPLICATIONS

This application is a divisional of U.S. patent application Ser. No. 12/534,490, filed on Aug. 3, 2009, which is hereby incorporated by reference as though fully set forth herein.

FIELD OF THE INVENTION

The present invention relates to glass compositions and, in particular, to glass compositions for forming fibers.

BACKGROUND OF THE INVENTION

Large scale commercial production of continuous glass fibers (E-glass and C-glass types) comprises melting batch materials consisting primarily of minerals that are crystalline or substantially crystalline in nature. Conversion of these crystalline raw materials to a glassy state requires significant energy to be applied during the melting process. In view of the significant energy investment accompanying crystalline materials, glassy or amorphous minerals have sometimes been used in the production of glass compositions. A glassy or amorphous structure can reduce the amount of energy consumed in the melting process. Glassy minerals such as basalt and obsidian, for example, have been used as significant portions of feedstock for the production of mineral wool.

An associated disadvantage with some glassy minerals, however, is the high iron content of such minerals. Basalt and obsidian both comprise relatively large amounts of iron, thereby making their resulting melts highly energy absorbing. As a result, use of conventional gas fired furnaces is typically impractical for melt processing of these minerals. Electrical melting can be used to process glassy minerals of high iron content, but this is often a constraint in high volume glass fiber production as compared with conventional gas fired furnace technology. Raw materials used in the production of E-glass and C-glass fibers are generally low in iron, thereby permitting the use of large scale gas fired furnaces.

Perlite (and its expanded form pumice) is a mineral that naturally occurs in the glassy form. Perlite has not been extensively used as a raw material in glass production, partially because of its compositional parameters. The major constituents of perlite are $SiO_2$, $Al_2O_3$ and alkali oxide ($R_2O$). $SiO_2$ is typically present in perlite in an amount between about 70 and about 75 weight percent. $Al_2O_3$ is typically present in perlite in an amount between about 12 and about 15 weight percent. Alkali oxides are typically present in perlite in an amount between about 3 and about 9 weight percent. These parameters conflict with the compositional requirements of several widely used glass compositions, including, for example, those of E-glass and C-glass.

E-glass compositions, for example, are well-suited for forming glass fibers. As a result, the majority of glass fibers used in reinforcement applications, such as polymeric reinforcement applications, are formed from E-glass compositions. E-glass compositions generally limit the amount alkali oxides to no more than 2 percent. The high alkali oxide content of perlite is inconsistent with this limitation and renders perlite largely unsuitable for use in batch compositions for the production of E-glass compositions.

Moreover, C-glass compositions have also been used to form fibers resistant to corrosion in acidic environments. In order to resist acidic corrosion, C-glass compositions comprise a high $SiO_2$ content and a low $Al_2O_3$ content (<8 wt. %). The high $Al_2O_3$ content of perlite generally precludes use of perlite in batch compositions for the production of C-glass compositions.

SUMMARY

In one aspect, the present invention provides glass compositions formed from batch compositions comprising significant amounts of one or more glassy minerals, including perlite and/or pumice. In another aspect, the present invention provides glass fibers formed from glass compositions described herein.

In one embodiment, the present invention provides a glass composition formed from a batch composition comprising at least 50 weight percent of a glassy mineral and at least 5 weight percent of a sodium source, wherein the glassy mineral comprises a combination of $SiO_2$ and $Al_2O_3$ in an amount of at least 80 weight percent. In some embodiments, the batch composition comprises at least 65 weight percent of a glassy mineral, the glassy mineral comprising a combination of $SiO_2$ and $Al_2O_3$ in an amount of at least 80 weight percent. In some embodiments, the glassy mineral comprising a combination of $SiO_2$ and $Al_2O_3$ is perlite, pumice or mixtures thereof.

Moreover, in some embodiments, the batch comprises at least 10 weight percent of a sodium source. A sodium source, in some embodiments, comprises sodium carbonate (soda).

In another embodiment, the present invention provides a glass composition comprising 53-64 weight percent $SiO_2$, 8-12 weight percent $Al_2O_3$, 8.5-18 weight percent alkali oxide ($R_2O$) component and a metal oxide (RO) component, wherein the metal oxide component is present in an amount to provide a mass ratio of $R_2O/RO$ ranging from about 0.15 to about 1.5.

In some embodiments, a $R_2O$ component comprises $Na_2O$, $K_2O$ or $Li_2O$ or mixtures thereof. In some embodiments, a glass composition of the present invention comprises $Na_2O$ in an amount ranging from 6.5 weight percent to about 16 weight percent. A glass composition, in some embodiment, comprises $K_2O$ in an amount ranging from 2 weight percent to 4 weight percent. In some embodiments, a glass composition comprises $Li_2O$ in an amount up to 2 weight percent.

In some embodiments, a RO component comprises MgO, CaO, SrO, BaO, or ZnO or mixtures thereof. A RO component, in some embodiments, is present in a glass composition of the present invention in an amount ranging from 7 weight percent to 31 weight percent. In one embodiment, a glass composition comprises MgO in an amount up to about 5 weight percent. A glass composition, in some embodiments, comprises CaO in an amount ranging from 7 weight percent to 26 weight percent. In some embodiments, a glass composition comprises ZnO in an amount up to 3 weight percent.

Glass compositions of the present invention, in some embodiments, comprise metal oxides in addition to RO including, but not limited to, $ZrO_2$, $TiO_2$, $MnO_2$ or $La_2O_3$ or mixtures thereof.

In another embodiment, the present invention provides a glass composition comprising 56-63 weight percent $SiO_2$, 9-12 weight percent $Al_2O_3$, 12-17 weight percent RO (CaO+ MgO), 12-14 weight percent $R_2O$ ($Na_2O+K_2O$), 0-2 weight percent $Li_2O$, 0-3 weight percent ZnO, 0-3 weight percent $ZrO_2$, 0-3 weight percent $MnO_2$ and 0-3 weight percent $La_2O_3$.

In another embodiment, the present invention provides a glass composition comprising 60-64 weight percent $SiO_2$, 9-12 weight percent $Al_2O_3$, 7-15 weight percent RO (CaO+MgO), 13-15.5 weight percent $R_2O$ ($Na_2O+K_2O$), 0-2 weight percent $Li_2O$, 0-3 weight percent ZnO, 0-3 weight percent $ZrO_2$, 0-3 weight percent $MnO_2$ and 0-3 weight percent $La_2O_3$.

In another embodiment, the present invention provides a glass composition comprising 55-63 weight percent $SiO_2$, 9-14 weight percent $Al_2O_3$, 11-16.5 weight percent RO (CaO+MgO), 14-17 weight percent $R_2O$ ($Na_2O+K_2O$), 0-2 weight percent $Li_2O$, 0-3 weight percent ZnO, 0-3 weight percent $ZrO_2$, 0-3 weight percent $MnO_2$ and 0-3 weight percent $La_2O_3$.

In some embodiments, glass compositions of the present invention have an $Fe_2O_3$ content of less than 1 weight percent. Glass compositions, in other embodiments, can comprise less than 0.7 weight percent $Fe_2O_3$.

Glass compositions, according to some embodiments of the present invention are fiberizable. In some embodiments, glass compositions of the present invention have a forming temperature ($T_F$) ranging from 1120° C. to about 1300° C. As used herein, the term "forming temperature" means the temperature at which the glass composition has a viscosity of 1000 poise (or "log 3 temperature"). In some embodiments, glass compositions of the present invention are fiberizable at the forming temperature.

Moreover, in some embodiments, glass compositions of the present invention have a liquidus temperature ($T_L$) ranging from about 1020° C. to about 1240° C. In some embodiments, the difference between the forming temperature and the liquidus temperature of a glass composition of the present invention ranges from about 45° C. to about 165° C. In some embodiments, the difference between the forming temperature and the liquidus temperature of a glass composition of the present invention is at least 65° C.

In some embodiments, glass compositions of the present invention have a molten density at the forming temperature ranging from 2.35 g/cm² to 2.40 g/cm². In some embodiments, glass composition of the present invention have molten density ranging from 2.36 g/cm² to 2.38 g/cm².

Glass compositions of the present invention, in some embodiments, have a molten surface tension at the forming temperature ranging from about 390 $E^{-3}$ N/m to 400 $E^{-3}$ N/m.

As provided herein, glass fibers can be formed from some embodiments of the glass compositions of the present invention. In some embodiments, fibers formed from glass compositions of the present invention have a modulus (E) ranging from about 53 GPa to about 65 GPa. Moreover, in some embodiments, fibers formed from glass compositions of the present invention have a specific strength ranging from 1.30-1.35 $E^5$ m.

Fibers formed from glass compositions of the present invention, in some embodiments, also demonstrate acidic and alkaline corrosion resistance. In one embodiment, for example, a fiber formed from a glass composition of the present invention has a weight loss (wt. %) ranging from about 0.55 to about 0.60 when exposed to 1N $H_2SO_4$ (pH 0) at 100° C. for one hour. In another embodiment, a fiber formed from a glass composition of the present invention has a weight loss (wt. %) ranging from about 0.25 to 0.30 when exposed to 0.1N NaOH (pH 12) at 100° C. for one hour.

Glass fibers formed from glass compositions of the present invention can be used in various reinforcement applications. In some embodiments, glass fibers of the present invention are used in the reinforcement of polymers including thermoplastics and thermosets. In some embodiments, glass fibers formed from glass compositions of the present invention are used in the reinforcement of building materials including, but not limited to, cement and roofing systems such as shingles.

In another aspect, the present invention provides methods of making glass compositions from batch compositions comprising significant amounts of one or more glassy minerals, including perlite and/or pumice.

In one embodiment, a method of making a glass composition of the present invention comprises providing a batch composition comprising at least 50 weight percent of a glassy mineral and at least 5 weight percent of a sodium source, the glassy mineral comprising a combination of $SiO_2$ and $Al_2O_3$ in an amount of at least 80 weight percent and heating the batch composition to a temperature sufficient to form the glass composition. In some embodiments, the batch composition is heated to a temperature of about 1400° C. to about 1450° C.

These and other embodiments are presented in greater detail in the detailed description which follows.

DETAILED DESCRIPTION

Figure 1:
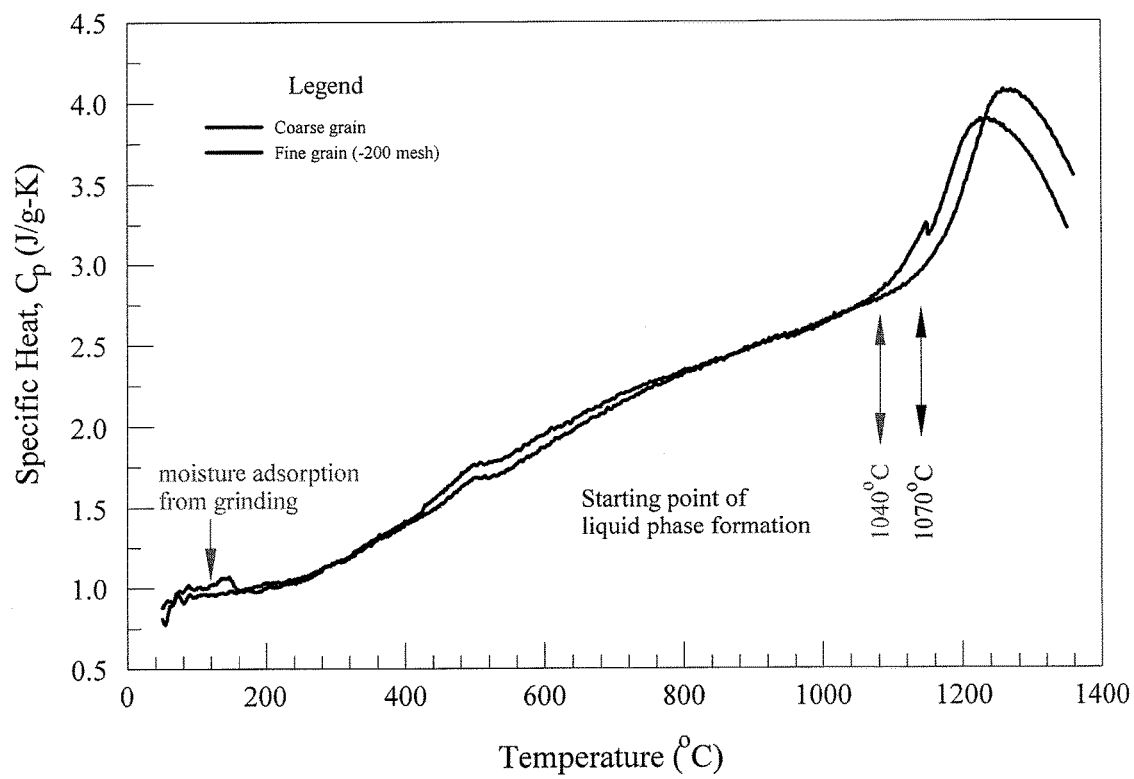
FIG. 1 provides the results of a high temperature differential thermal analysis (DTA) comparing conversion from solid to liquid of fine particulate perlite and a coarse particulate perlite according to one embodiment of the present invention.

Unless indicated to the contrary, the numerical parameters set forth in the following specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

Certain embodiments of the present invention can employ the various thermodynamic and processing advantages offered by glassy minerals to provide glass compositions having desirable properties. In one aspect, the present invention provides glass compositions formed from batch compositions comprising significant amounts of one or more glassy minerals, including perlite and/or pumice. The glass compositions, in some embodiments, can be fiberizable glass compositions. In some embodiments, glass fibers formed from glass compositions of the present invention can demonstrate advantageous properties including, but not limited to, mechanical and corrosion resistant properties equaling or exceeding glass fibers formed from previous compositions, such as E-glass and C-glass compositions.

Various embodiments of the present invention provide glass compositions, including, without limitation, fiberizable glass compositions. In one embodiment, the present invention provides a glass composition formed from a batch composition comprising at least 50 weight percent of a glassy mineral and at least 5 weight percent of a sodium source, wherein the glassy mineral comprises a combination of $SiO_2$ and $Al_2O_3$ in an amount of at least 80 weight percent. In some embodiments, the batch composition comprises at least 65 weight percent of a glassy mineral, the glassy mineral comprising a combination of $SiO_2$ and $Al_2O_3$ in an amount of at least 80 weight percent. In another embodiment, the batch composition comprises at least 68 weight percent of a glassy mineral, the glassy mineral comprising a combination of $SiO_2$ and $Al_2O_3$ in an amount of at least 80 weight percent.

In some embodiments, a glassy mineral comprising a combination of $SiO_2$ and $Al_2O_3$ in an amount of at least 80 weight percent is perlite, pumice or mixtures thereof.

Moreover, in some embodiments, the batch composition comprises at least 10 weight percent of a sodium source. In another embodiment, the batch composition comprises at least 12 weight percent of a sodium source. A suitable sodium source for use in batch compositions of the present invention, in some embodiments, comprises sodium carbonate (soda).

In another embodiment, the present invention provides a glass composition comprising 53-64 weight percent $SiO_2$, 8-12 weight percent $Al_2O_3$, 8.5-18 weight percent alkali oxide ($R_2O$) component and a metal oxide (RO) component, wherein the metal oxide component is present in an amount to provide a mass ratio of $R_2O/RO$ ranging from about 0.15 to about 1.5.

In some embodiments, a $R_2O$ component is not limited to a single compound but can comprise several compounds. In some embodiments, a $R_2O$ component comprises $Na_2O$, $K_2O$ or $Li_2O$ or mixtures thereof. Moreover, in some embodiments and without limitation, a $R_2O$ component can mean $Na_2O$ only, $K_2O$ only, $Li_2O$ only, a combination of $Na_2O$ and $K_2O$, a combination of $K_2O$ and $Li_2O$, a combination of $Na_2O$ and $Li_2O$, or a combination of $Na_2O$, $K_2O$ and $Li_2O$.

In some embodiments, a glass composition of the present invention comprises $Na_2O$ in an amount ranging from 6.5 weight percent to about 16 weight percent. In another embodiment, a glass composition comprises $Na_2O$ in an amount ranging from 9 weight percent to 13 weight percent. In some embodiments, a glass composition comprises $Na_2O$ in an amount ranging from 10 weight percent to 12.5 weight percent.

A glass composition of the present invention, in some embodiments, comprises $K_2O$ in an amount ranging from 2 weight percent to 4 weight percent. In some embodiments, a glass composition comprises $K_2O$ in an amount ranging from 2.5 weight percent to 3.5 weight percent.

In some embodiments, a glass composition of the present invention comprises $Li_2O$ in an amount up to 2 weight percent. A glass composition, in another embodiment, comprises $Li_2O$ in an amount ranging from 0.5 weight percent to 1.5 weight percent.

In some embodiments, a RO component comprises MgO, CaO, SrO, BaO or ZnO or mixtures thereof. In some embodiments, a RO component can comprise MgO only, CaO only, SrO only, BaO only or ZnO only. In some embodiments, a RO component can comprise any combination of two or more metal oxides of MgO, CaO, SrO, BaO and ZnO. A RO component, in some embodiments, is present in a glass composition of the present invention in an amount ranging from 7 weight percent to 31 weight percent.

In one embodiment, a glass composition of the present invention comprises MgO in an amount up to 5 weight percent. A glass composition, in another embodiment, comprises MgO in an amount ranging from 1 weight percent to 4 weight percent. In some embodiments, a glass composition comprises MgO in an amount ranging from 2 weight percent to 3 weight percent.

In some embodiments, a glass composition of the present invention comprises CaO in an amount ranging from 7 weight percent to 26 weight percent. A glass composition, in another embodiment, comprises CaO in an amount ranging from 8 weight percent to 20 weight percent. In some embodiments, a glass composition comprises CaO in an amount ranging from 10 weight percent to 14 weight percent.

In some embodiments, a glass composition comprises ZnO in an amount up to 3 weight percent.

Glass compositions of the present invention, in some embodiments, comprise metal oxides in addition to RO including, but not limited to $ZrO_2$, $TiO_2$, $MnO_2$ or $La_2O_3$ or mixtures thereof. In some embodiments, a glass composition can comprise $ZrO_2$ in an amount up to 3 weight percent, TiO$_2$ in an amount up to 3 weight percent, MnO$_2$ in an amount up to 3 weight percent and/or La$_2$O$_3$ in an amount up to 3 weight percent.

In another embodiment, the present invention provides a glass composition comprising 56-63 weight percent SiO$_2$, 9-12 weight percent Al$_2$O$_3$, 12-17 weight percent RO (CaO+MgO), 12-14 weight percent R$_2$O (Na$_2$O+K$_2$O), 0-2 weight percent Li$_2$O, 0-3 weight percent ZnO, 0-3 weight percent ZrO$_2$, 0-3 weight percent MnO$_2$ and 0-3 weight percent La$_2$O$_3$.

In another embodiment, the present invention provides a glass composition comprising 60-64 weight percent SiO$_2$, 9-12 weight percent Al$_2$O$_3$, 7-15 weight percent RO (CaO+MgO), 13-15.5 weight percent R$_2$O (Na$_2$O+K$_2$O), 0-2 weight percent Li$_2$O, 0-3 weight percent ZnO, 0-3 weight percent ZrO$_2$, 0-3 weight percent MnO$_2$ and 0-3 weight percent La$_2$O$_3$.

In another embodiment, the present invention provides a glass composition comprising 55-63 weight percent SiO$_2$, 9-14 weight percent Al$_2$O$_3$, 11-16.5 weight percent RO (CaO+MgO), 14-17 weight percent R$_2$O (Na$_2$O+K$_2$O), 0-2 weight percent Li$_2$O, 0-3 weight percent ZnO, 0-3 weight percent ZrO$_2$, 0-3 weight percent MnO$_2$ and 0-3 weight percent La$_2$O$_3$.

In some embodiments, glass compositions of the present invention have an Fe$_2$O$_3$ content of less than 1 weight percent. Glass compositions, in other embodiments, can comprise less than 0.7 weight percent Fe$_2$O$_3$.

Glass compositions of the present invention, in some embodiments, have a forming temperature ($T_F$) ranging from about 1120° C. to about 1300° C. In another embodiment, glass compositions of the present invention have a forming temperature ranging from about 1150° C. to about 1250° C. In some embodiments, glass compositions have a forming temperature ranging from about 1200° C. to about 1225° C.

Glass compositions of the present invention, in some embodiments, have a liquidus temperature ranging from about 1020° C. to about 1240° C. In another embodiment, glass compositions of the present invention have a liquidus temperature ranging from about 1070° C. to about 1200° C. In some embodiments, glass compositions of the present invention have a liquidus temperature ranging from about 1110° C. to about 1140° C.

In some embodiments, the difference between the forming temperature and the liquidus temperature of a glass composition of the present invention ranges from about 45° C. to about 165° C. In some embodiments, the difference between the forming temperature and the liquidus temperature of a glass composition of the present invention is at least 65° C.

In some embodiments, glass compositions of the present invention have a molten density at the forming temperature ranging from 2.35 g/cm$^2$ to 2.40 g/cm$^2$. In some embodiments, glass compositions of the present invention have molten density ranging from 2.36 g/cm$^2$ to 2.38 g/cm$^2$. As discussed further herein, in some embodiments, molten densities of some glass compositions of the present invention are 5% to 7% lower than the molten densities of some E-glass compositions. As a result, glass fibers formed from some glass compositions of the present invention are lighter per unit volume in comparison to some E-glass fibers. Lighter glass fibers can be advantageous in many applications, particularly material reinforcement application, such as polymeric reinforcement applications, where weight savings are often highly desirable. Moreover, as a result of lower densities, glass fibers formed from some glass compositions of the present invention can have larger diameters in comparison to some E-glass fibers of the same weight, thereby providing enhanced mechanical properties.

Additionally, glass compositions of the present invention, in some embodiments, have a molten surface tension at the forming temperature ranging from about 390 E$^{-3}$ N/m to 400 E$^{-3}$ N/m.

As provided herein, glass compositions of the present invention can be produced from batch compositions comprising a significant amount of one or more glassy minerals, including perlite and/or pumice. In being produced from batch compositions comprising a significant amount of glassy minerals, glass compositions of the present invention can realize sizable energy savings in some embodiments. As discussed further herein, in some embodiments, production of a melt of a glass composition of the present invention requires up to 33% less energy in comparison to that required to produce a melt of some E-glass compositions.

Glass compositions of the present invention can be produced by several methods. In one embodiment, a method of producing a glass composition comprises providing a batch composition comprising at least 50 weight percent of a glassy mineral and at least 5 weight percent of a sodium source, the glassy mineral comprising a combination of SiO$_2$ and Al$_2$O$_3$ in an amount of at least 80 weight percent and heating the batch composition to a temperature sufficient to form a melt of the glass composition. In some embodiments, the batch composition is heated to a temperature of about 1400° C. to about 1450° C.

In some embodiments, the batch composition comprises at least 65 weight percent of a glassy mineral, the glassy mineral comprising a combination of SiO$_2$ and Al$_2$O$_3$ in an amount of at least 80 weight percent. In another embodiment, the batch composition comprises at least 68 weight percent of a glassy mineral, the glassy mineral comprising a combination of SiO$_2$ and Al$_2$O$_3$ in an amount of at least 80 weight percent.

In some embodiments, a glassy mineral comprising a combination of SiO$_2$ and Al$_2$O$_3$ in an amount of at least 80 weight percent is perlite, pumice or mixtures thereof. Perlite and/or pumice used in the production of glass compositions of the present invention, in some embodiments, is provided in particulate or powder form. In some embodiments, additional energy savings can be realized by using perlite and/or pumice compositions having fine particle size as opposed to coarser particle sizes. FIG. 1 illustrates the results of a high temperature differential thermal analysis (DTA) comparing the conversion from solid to liquid of a fine particulate perlite (about 200 mesh) and a coarse particulate perlite (about 45 mesh). As illustrated in FIG. 1, the fine particulate perlite requires less energy during conversion from solid to liquid in comparison to the coarse particulate perlite, although both the fine and the coarse particulate perlite are glassy or amorphous at room temperature. Moreover, the fine particulate perlite begins liquid formation at a lower temperature than the coarse particulate perlite.

Moreover, in some embodiments, batch compositions of the present invention comprise at least 10 weight percent of a sodium source. In some embodiments, batch compositions comprise at least 12 weight percent of a sodium source. A suitable sodium source for use in batch compositions of the present invention, in some embodiments, comprises sodium carbonate (soda).

In some embodiments, batch compositions used to produce glass compositions of the present invention further comprise other minerals including, but not limited to, limestone, dolomite or mixtures thereof. In one embodiment, for example, a batch composition further comprises up to 17 weight percent limestone. In another embodiment, a batch composition further comprises up to 13 weight percent dolomite.

As provided herein, glass fibers can be formed from any of the glass compositions of the present invention. Glass fibers according to the various embodiments of the present invention can be formed using any process known in the art for forming glass fibers, and more desirably, any process known in the art for forming essentially continuous glass fibers. For example, although not limiting herein, the glass fibers according to non-limiting embodiments of the present invention can be formed using direct-melt or indirect-melt fiber forming methods. These methods are well known in the art and further discussion thereof is not believed to be necessary in view of the present disclosure. See, e.g., K. L. Loewenstein, *The Manufacturing Technology of Continuous Glass Fibers*, $3^{rd}$ Ed., Elsevier, N.Y., 1993 at pages 47-48 and 117-234.

In one embodiment, the present invention provides a glass fiber comprising a glass composition formed from a batch composition comprising at least 50 weight percent of a glassy mineral and at least 5 weight percent of a sodium source, wherein the glassy mineral comprises a combination of $SiO_2$ and $Al_2O_3$ in an amount of at least 80 weight percent. In some embodiments, the batch composition comprises at least 65 weight percent of a glassy mineral, the glassy mineral comprising a combination of $SiO_2$ and $Al_2O_3$ in an amount of at least 80 weight percent. In another embodiment, the batch composition comprises at least 68 weight percent of a glassy mineral, the glassy mineral comprising a combination of $SiO_2$ and $Al_2O_3$ in an amount of at least 80 weight percent.

In another embodiment, the present invention provides a glass fiber comprising 53-64 weight percent $SiO_2$, 8-12 weight percent $Al_2O_3$, 8.5-18 weight percent alkali oxide ($R_2O$) component and a metal oxide (RO) component, wherein the metal oxide component is present in an amount to provide a mass ratio of $R_2O/RO$ ranging from about 0.15 to about 1.5.

In another embodiment, the present invention provides a glass fiber comprising 56-63 weight percent $SiO_2$, 9-12 weight percent $Al_2O_3$, 12-17 weight percent RO (CaO+ MgO), 12-14 weight percent $R_2O$ ($Na_2O+K_2O$), 0-2 weight percent $Li_2O$, 0-3 weight percent ZnO, 0-3 weight percent $ZrO_2$, 0-3 weight percent $MnO_2$ and 0-3 weight percent $La_2O_3$.

In another embodiment, the present invention provides a glass fiber comprising 60-64 weight percent $SiO_2$, 9-12 weight percent $Al_2O_3$, 7-15 weight percent RO (CaO+ MgO), 13-15.5 weight percent $R_2O$ ($Na_2O+K_2O$)), 0-2 weight percent $Li_2O$, 0-3 weight percent ZnO, 0-3 weight percent $ZrO_2$, 0-3 weight percent $MnO_2$ and 0-3 weight percent $La_2O_3$.

In another embodiment, the present invention provides a glass fiber comprising 55-63 weight percent $SiO_2$, 9-14 weight percent $Al_2O_3$, 11-16.5 weight percent RO (CaO+ MgO), 14-17 weight percent $R_2O$ ($Na_2O+K_2O$), 0-2 weight percent $Li_2O$, 0-3 weight percent ZnO, 0-3 weight percent $ZrO_2$, 0-3 weight percent $MnO_2$ and 0-3 weight percent $La_2O_3$.

In some embodiments, fibers formed from glass compositions of the present invention have a modulus (E) ranging from about 53.0 GPa to about 65.0 GPa. In another embodiment, fibers formed form glass compositions of the present invention have a modulus (E) ranging from about 56 GPa to about 62 GPa. Moreover, in some embodiments, fibers formed from glass compositions of the present invention have a specific strength ranging from 1.30-1.35 $E^5$ m.

Fibers formed from glass compositions of the present invention, in some embodiments, also demonstrate acidic and alkaline corrosion resistance. In one embodiment, for example, a glass fiber formed from a glass composition of the present invention has a weight loss (wt. %) ranging from 0.55 to 0.60 when exposed to 1N $H_2SO_4$ (pH 0) at 100° C. for one hour. In another embodiment, a glass fiber formed from a glass composition of the present invention has a weight loss (wt. %) ranging from 0.60 to 1.70 when exposed to 1N $H_2SO_4$ (pH 0) at 100° C. for one hour.

In another embodiment, a fiber formed from a glass composition of the present invention has a weight loss (wt. %) ranging from about 0.25 to about 0.30 when exposed to 0.1N NaOH (pH 12) at 100° C. for one hour. A fiber formed from a glass composition of the present invention, in some embodiments, has a weight loss (wt. %) ranging from 0.35 to 0.85 when exposed to 0.1N NaOH (pH 12) at 100° C. for one hour.

Although not limiting herein, glass fibers according to some embodiments of the present invention can be useful in structural reinforcement applications. In some embodiments, glass fibers of the present invention are used in the reinforcement of polymers including thermoplastics and thermosets. In some embodiments, glass fibers formed from glass compositions of the present invention are used in the reinforcement of building materials including, but not limited to, cement and roofing systems such as shingles.

In one embodiment, the present invention provides a polymeric composite comprising a polymeric material and at least one glass fiber in the polymeric material, the at least one glass fiber comprising a glass composition a formed from a batch composition comprising at least 50 weight percent of a glassy mineral and at least 5 weight percent of a sodium source, wherein the glassy mineral comprises a combination of $SiO_2$ and $Al_2O_3$ in an amount of at least 80 weight percent. In some embodiments, the batch composition comprises at least 65 weight percent of a glassy mineral, the glassy mineral comprising a combination of $SiO_2$ and $Al_2O_3$ in an amount of at least 80 weight percent. In another embodiment, the batch composition comprises at least 68 weight percent of a glassy mineral, the glassy mineral comprising a combination of $SiO_2$ and $Al_2O_3$ in an amount of at least 80 weight percent.

In another embodiment, the present invention provides a polymeric composite comprising a polymeric material and at least one glass fiber in the polymeric material, the at least one glass fiber comprising 53-64 weight percent $SiO_2$, 8-12 weight percent $Al_2O_3$, 8.5-18 weight percent alkali oxide ($R_2O$) component and a metal oxide (RO) component, wherein the metal oxide component is present in an amount to provide a mass ratio of $R_2O/RO$ ranging from about 0.15 to about 1.5.

In another embodiment, the present invention provides a polymeric composite comprising a polymeric material and at least one glass fiber in the polymeric material, the at least one glass fiber comprising 56-63 weight percent $SiO_2$, 9-12 weight percent $Al_2O_3$, 12-17 weight percent RO (CaO+ MgO), 12-14 weight percent $R_2O$ ($Na_2O+K_2O$), 0-2 weight percent $Li_2O$, 0-3 weight percent ZnO, 0-3 weight percent $ZrO_2$, 0-3 weight percent $MnO_2$ and 0-3 weight percent $La_2O_3$.

In another embodiment, the present invention provides a polymeric composite comprising a polymeric material and at least one glass fiber in the polymeric material, the at least one glass fiber comprising 60-64 weight percent $SiO_2$, 9-12 weight percent $Al_2O_3$, 7-15 weight percent RO (CaO+MgO), 13-15.5 weight percent $R_2O$ ($Na_2O+K_2O$)), 0-2 weight percent $Li_2O$, 0-3 weight percent ZnO, 0-3 weight percent $ZrO_2$, 0-3 weight percent $MnO_2$ and 0-3 weight percent $La_2O_3$.

In another embodiment, the present invention provides a polymeric composite comprising a polymeric material and at least one glass fiber in the polymeric material, the at least one glass fiber comprising 55-63 weight percent $SiO_2$, 9-14 weight percent $Al_2O_3$, 11-16.5 weight percent RO (CaO+MgO), 14-17 weight percent $R_2O$ ($Na_2O+K_2O$), 0-2 weight percent $Li_2O$, 0-3 weight percent ZnO, 0-3 weight percent $ZrO_2$, 0-3 weight percent $MnO_2$ and 0-3 weight percent $La_2O_3$.

Polymeric composites according to the various embodiments of the present invention can be made by any method known in the art for making polymeric composites. For example, in one embodiment, polymeric composites according to the present invention can be made by impregnating woven fabrics or non-woven fabrics or mats of glass fibers with a polymeric material and then curing the polymeric material. In another embodiment, continuous glass fibers and/or chopped glass fibers comprising glass compositions of the present invention can be disposed in the polymeric material. Depending on the identity of the polymeric material, the polymeric material can be cured subsequent to receiving the continuous or chopped glass fibers.

Various non-limiting embodiments of the present invention will now be illustrated in the following, non-limiting examples.

Examples 1 through 6 of glass compositions of the present invention provided in Table I were prepared by providing mixtures of ingredients covering 65-72 weight percent perlite, 0-22 weight percent dolomite, 6-35 weight percent limestone and 0-8 weight percent soda. The specific amounts of perlite, dolomite, limestone and/or soda used to produce Examples 1 through 6 were determined by reference to the compositional parameters of each mineral in relation to the desired compositional parameters of each glass composition. Mixtures of the minerals were subsequently heated to a temperature of about 1400° C. to obtain molten glass compositions. The molten glass compositions were cooled to provide glass compositions of Examples 1 through 6.

TABLE I

Glass Compositions

| Ex. | $SiO_2$ | $Al_2O_3$ | CaO | MgO | $Na_2O$ | $K_2O$ | $R_2O$ | $Fe_2O_3$ | $TiO_2$ | $SO_3$ | F | $M_xO_y$ |
|---|---|---|---|---|---|---|---|---|---|---|---|---|
| 1 | 59.29 | 10.84 | 20.37 | 3.00 | 2.82 | 3.06 | 5.88 | 0.48 | 0.14 | 0.00 | 0.00 | 0.00 |
| 2 | 59.29 | 10.84 | 19.37 | 4.00 | 2.82 | 3.06 | 5.88 | 0.48 | 0.14 | 0.00 | 0.00 | 0.00 |
| 3 | 59.29 | 10.84 | 18.87 | 4.50 | 2.82 | 3.06 | 5.88 | 0.48 | 0.14 | 0.00 | 0.00 | 0.00 |
| 4 | 59.29 | 10.84 | 18.37 | 5.00 | 2.82 | 3.06 | 5.88 | 0.48 | 0.14 | 0.00 | 0.00 | 0.00 |
| 5 | 54.41 | 9.95 | 25.68 | 4.00 | 2.76 | 2.59 | 5.38 | 0.47 | 0.14 | 0.00 | 0.00 | 0.00 |
| 6 | 59.29 | 10.84 | 23.37 | 0.00 | 2.82 | 3.06 | 5.88 | 0.48 | 0.14 | 0.00 | 0.00 | 0.00 |

Examples 7 through 13 of glass compositions of the present invention provided in Table II were prepared by providing mixtures of ingredients covering 69-71 weight percent perlite, 6-20 weight percent limestone and 7-10 weight percent soda. The specific amounts of perlite, limestone and soda used to produce Examples 7 through 13 were determined by reference to the compositional parameters of each mineral in relation to the desired compositional parameters of each glass composition. Mixtures of the minerals were subsequently heated to a temperature of about 1400° C. to obtain molten glass compositions. The molten glass compositions were cooled to provide glass compositions of Examples 7 through 13.

TABLE II

Glass Compositions

| Ex. | $SiO_2$ | $Al_2O_3$ | CaO | MgO | $Na_2O$ | $K_2O$ | $R_2O$ | $Fe_2O_3$ | $TiO_2$ | $SO_3$ | F | $M_xO_y$ |
|---|---|---|---|---|---|---|---|---|---|---|---|---|
| 7 | 62.66 | 11.46 | 9.28 | 2.98 | 9.20 | 3.23 | 12.43 | 0.51 | 0.14 | 0.25 | 0.30 | 0.00 |
| 8 | 61.11 | 11.17 | 14.03 | 0.00 | 9.29 | 3.15 | 12.42 | 0.49 | 0.14 | 0.32 | 0.30 | 0.00 |
| 9 | 62.61 | 11.45 | 11.26 | 0.00 | 10.19 | 3.23 | 13.42 | 0.51 | 0.14 | 0.32 | 0.30 | 0.00 |
| 10 | 61.13 | 11.17 | 13.04 | 0.00 | 10.19 | 3.23 | 13.42 | 0.49 | 0.14 | 0.32 | 0.30 | 0.00 |
| 11 | 58.93 | 10.76 | 12.57 | 0.00 | 10.34 | 2.60 | 13.22 | 0.47 | 3.00 | 0.09 | 0.28 | 0.95* |
| 12 | 58.93 | 10.76 | 12.57 | 0.00 | 10.34 | 2.60 | 13.22 | 0.47 | 1.08 | 0.09 | 0.28 | 2.87* |
| 13 | 57.47 | 10.78 | 9.12 | 0.00 | 10.44 | 3.05 | 13.49 | 0.62 | 0.15 | 0.09 | 0.28 | 8.00* |

*$ZrO_2$ and $TiO_2$ were added to the batch composition used to produce the glass composition.

Examples 14 through 19 of glass compositions of the present invention provided in Table III were prepared by providing mixtures of ingredients covering 69-72 weight percent perlite, 0-13 weight percent dolomite, 3-17 weight percent limestone and 7-10 weight percent soda. The specific amounts of perlite, limestone, soda and/or dolomite used to produce Examples 14 through 19 were determined by reference to the compositional parameters of each mineral in relation to the desired compositional parameters of each glass composition. Mixtures of the minerals were subsequently heated to a temperature of about 1400° C. to obtain molten glass compositions. The molten glass compositions were cooled to provide glass compositions of Examples 14 through 19.

TABLE III

Glass Compositions

| Ex. | $SiO_2$ | $Al_2O_3$ | CaO | MgO | $Na_2O$ | $K_2O$ | $R_2O$ | $Fe_2O_3$ | $TiO_2$ | $SO_3$ | F | $M_xO_y$ |
|---|---|---|---|---|---|---|---|---|---|---|---|---|
| 14 | 62.62 | 11.45 | 10.77 | 0.00 | 10.69 | 3.23 | 13.92 | 0.51 | 0.14 | 0.30 | 0.30 | 0.00 |
| 15 | 61.91 | 11.38 | 7.99 | 3.00 | 11.21 | 3.27 | 14.48# | 0.60 | 0.14 | 0.20 | 0.00 | 1.0#/0.30* |
| 16 | 63.65 | 11.93 | 4.39 | 2.56 | 13.04 | 3.37 | 16.41 | 0.70 | 0.17 | 0.20 | 0.00 | 0.00 |
| 17 | 61.14 | 11.17 | 12.05 | 0.00 | 11.26 | 3.15 | 14.41 | 0.49 | 0.14 | 0.30 | 0.30 | 0.00 |
| 18 | 61.65 | 11.29 | 10.94 | 0.00 | 11.73 | 3.18 | 14.92 | 0.52 | 0.14 | 0.25 | 0.30 | 0.00 |
| 19 | 61.65 | 11.29 | 7.96 | 2.98 | 11.73 | 3.18 | 14.92 | 0.52 | 0.14 | 0.30 | 0.25 | 0.00 |

1 wt % $Li_2O$ replaced 1 wt % $Na_2O$; $Sb_2O_3$ used in refining removed
*$Sb_2O_3$ used for refining Examples 20 through 37 of glass compositions of the present invention provided in Table IV were prepared by providing mixtures of ingredients covering 68-73 weight percent perlite, 0-13 weight percent dolomite, 4-16 weight percent limestone and 12-17 weight percent soda. The specific amounts of perlite, limestone, soda and/or dolomite used to produce Examples 20 through 37 were determined by reference to the compositional parameters of each mineral in relation to the desired compositional parameters of each glass composition. Mixtures of the minerals were subsequently heated to a temperature of about 1400° C. to obtain molten glass compositions. The molten glass compositions were cooled to provide glass compositions of Examples 20 through 37.

TABLE IV

Glass Compositions

| Ex. | $SiO_2$ | $Al_2O_3$ | CaO | MgO | $Na_2O$ | $K_2O$ | $R_2O$ | $Fe_2O_3$ | $TiO_2$ | $SO_3$ | F | $M_xO_y$ |
|---|---|---|---|---|---|---|---|---|---|---|---|---|
| 20 | 61.14 | 11.17 | 11.05 | 0.00 | 12.26 | 3.15 | 15.41 | 0.49 | 0.14 | 0.30 | 0.30 | 0.00 |
| 21 | 60.78 | 11.10 | 11.65 | 0.00 | 12.31 | 3.13 | 15.44 | 0.50 | 0.14 | 0.20 | 0.20 | 0.00 |
| 22 | 60.74 | 11.09 | 8.65 | 2.99 | 12.31 | 3.13 | 15.44 | 0.50 | 0.14 | 0.20 | 0.25 | 0.00 |
| 23 | 61.01 | 10.77 | 8.25 | 2.97 | 12.30 | 3.91 | 16.20 | 0.58 | 0.07 | 0.02 | 0.12 | 0.00 |
| 24 | 60.64 | 10.71 | 8.80 | 2.96 | 12.22 | 3.88 | 16.10 | 0.58 | 0.07 | 0.02 | 0.12 | 0.00 |
| 25 | 60.94 | 10.76 | 8.79 | 2.54 | 12.28 | 3.90 | 16.18 | 0.58 | 0.07 | 0.02 | 0.12 | 0.00 |
| 26 | 60.22 | 10.63 | 9.15 | 2.52 | 10.54 | 3.86 | 14.40 | 2.88 | 0.07 | 0.02 | 0.11 | 0.00 |
| 27 | 60.92 | 10.76 | 8.24 | 2.97 | 12.28 | 3.90 | 16.18 | 0.58 | 0.07 | 0.18 | 0.12 | 0.00 |
| 28 | 60.55 | 10.69 | 8.78 | 2.96 | 12.20 | 3.88 | 16.08 | 0.58 | 0.07 | 0.18 | 0.12 | 0.00 |
| 29 | 60.84 | 10.74 | 8.77 | 2.54 | 12.26 | 3.90 | 16.15 | 0.58 | 0.07 | 0.18 | 0.12 | 0.00 |
| 30 | 60.12 | 10.62 | 9.13 | 2.51 | 10.53 | 3.85 | 14.38 | 2.88 | 0.07 | 0.17 | 0.11 | 0.00 |
| 31 | 55.33 | 9.77 | 12.86 | 5.38 | 4.59 | 3.54 | 8.13 | 0.54 | 0.06 | 0.07 | 0.11 | 7.75* |
| 32 | 58.03 | 10.25 | 13.49 | 5.64 | 4.81 | 3.71 | 8.53 | 0.56 | 0.07 | 0.07 | 0.11 | 3.25* |
| 33 | 55.59 | 9.82 | 6.17 | 3.06 | 10.03 | 3.56 | 13.59 | 0.53 | 0.06 | 0.07 | 0.11 | 11.01** |
| 34 | 62.34 | 14.32 | 11.20 | 0.38 | 9.04 | 2.17 | 11.21 | 0.34 | 0.04 | 0.11 | 0.06 | 0.00 |
| 35 | 62.87 | 11.50 | 7.98 | 0.00 | 13.25 | 3.24 | 16.50 | 0.51 | 0.14 | 0.30 | 0.20 | 0.00 |
| 36 | 61.14 | 11.17 | 10.06 | 0.00 | 13.25 | 3.15 | 16.40 | 0.49 | 0.14 | 0.30 | 0.30 | 0.00 |
| 37 | 60.25 | 11.01 | 9.00 | 1.98 | 12.70 | 3.54 | 16.24 | 0.81 | 0.03 | 0.12 | 0.00 | 0.00 |

*$B_2O_3$ used as additives
**ZnO used to replace 1 wt % $Na_2O$ and 1 wt % CaO plus $Sb_2O_3$ removal The glass composition of Example 38 provided in Table V was prepared in accordance with the glass composition of Example 12 above, except 1 wt % $Li_2O$ was used to replace 1 wt % $Na_2O$ and any $Sb_2O_3$ used during refining was removed. The glass composition of Example 39 in Table V was prepared in accordance with the glass composition of Example 12 above, except ZnO was used to replace 1 wt % $Na_2O$ and 1 wt % CaO and any $Sb_2O_3$ used during refining was removed.

TABLE V

Glass Compositions

| Ex. | $SiO_2$ | $Al_2O_3$ | CaO | MgO | $Na_2O$ | $K_2O$ | $R_2O$ | $Fe_2O_3$ | $TiO_2$ | $SO_3$ | F | $M_xO_y$ |
|---|---|---|---|---|---|---|---|---|---|---|---|---|
| 38 | 61.93 | 11.34 | 7.99 | 3.00 | 10.29 | 3.20 | 13.49 | 0.52 | 0.14 | 0.30 | 0.30 | 1.00 |
| 39 | 61.93 | 11.34 | 6.99 | 3.00 | 10.29 | 3.20 | 13.49 | 0.52 | 0.14 | 0.30 | 0.30 | 2.00 |

Examples 40 through 71 of glass compositions of the present invention provided in Table VI were prepared in accordance with the glass composition of Example 12 above, except the glass compositions were designed to include various combinations of $Li_2O$, $La_2O_3$, $MnO_2$, $TiO_2$, ZnO and $ZrO_2$. Various amounts of $Li_2CO_3$, $La_2O_3$, $MnO_2$, $TiO_2$, ZnO and $ZrO_2$ were incorporated into the batch composition of Example 12 to produce Examples 39-70. Moreover, each of the glass compositions of Examples 39-70 also included 0.09 wt % $SO_3$, 0.27-0.28 wt % F and 0.53-0.55 wt % $Fe_2O_3$.

invention assisted in the determination of how various compositional parameters affect processing considerations including forming temperatures ($T_F$) and liquidus ($T_L$) temperatures of the glass compositions.

Figure 2:
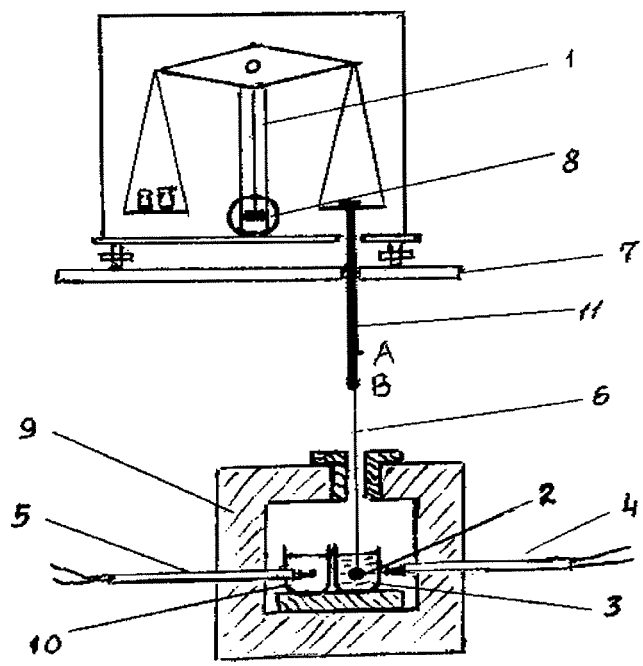
FIG. 2 illustrates an apparatus used in the determination of melt viscosities of glass compositions according to embodiments of the present invention.

The measurement of melt viscosity for determining forming temperatures of various glass compositions of the present invention was done by the counter-balance method over the viscosity range of $10^2$-$10^5$ Poise. The apparatus used to execute the method was calibrated using NIST standard glass. FIG. 2 shows schematics of the apparatus.

The apparatus (1) for measuring melt viscosity comprised a platinum ball (2) with a diameter of 16 mm. The platinum ball (2) was hung on a thin platinum wire (6) with the help of a special bracket/holder (11) attached to the right scale of the analytical balance. Initially, the first the end of the platinum wire (6) was attached to the bracket/holder at point A. After warming the furnace (9), the platinum ball was placed in the sample melt inside the crucible (3) and the first end of the wire was attached to the bracket/holder at point

TABLE VI

Glass Compositions

| Ex. | $SiO_2$ | $Al_2O_3$ | CaO | MgO | $Na_2O$ | $K_2O$ | $R_2O$ | $Li_2O$ | ZnO | $ZrO_2$ | $TiO_2$ | $La_2O_3$ | $MnO_2$ |
|---|---|---|---|---|---|---|---|---|---|---|---|---|---|
| 40 | 56.70 | 10.43 | 7.32 | 2.74 | 10.23 | 2.98 | 13.21 | 0.46 | 0.91 | 0.91 | 2.74 | 0.91 | 2.74 |
| 41 | 56.70 | 10.43 | 7.32 | 2.74 | 10.23 | 2.98 | 13.21 | 0.46 | 2.74 | 0.91 | 2.74 | 0.91 | 0.91 |
| 42 | 57.22 | 10.52 | 7.38 | 2.77 | 10.33 | 3.01 | 13.34 | 1.38 | 0.92 | 2.77 | 0.92 | 0.92 | 0.92 |
| 43 | 54.70 | 10.06 | 7.06 | 2.65 | 9.87 | 2.87 | 12.75 | 0.44 | 2.65 | 0.88 | 2.65 | 2.65 | 2.65 |
| 44 | 55.18 | 10.15 | 7.12 | 2.67 | 9.96 | 2.90 | 12.86 | 1.34 | 2.67 | 0.89 | 0.89 | 2.67 | 2.67 |
| 45 | 53.29 | 9.80 | 6.88 | 2.58 | 9.62 | 2.80 | 12.42 | 1.29 | 2.58 | 2.58 | 2.58 | 2.58 | 2.58 |
| 46 | 54.70 | 10.06 | 7.06 | 2.65 | 9.87 | 2.87 | 12.75 | 0.44 | 2.65 | 2.65 | 2.65 | 0.88 | 2.65 |
| 47 | 55.18 | 10.15 | 7.12 | 2.67 | 9.96 | 2.90 | 12.86 | 1.34 | 0.89 | 2.67 | 2.67 | 0.89 | 2.67 |
| 48 | 58.85 | 10.82 | 7.59 | 2.85 | 10.62 | 3.09 | 13.72 | 0.47 | 0.95 | 0.95 | 0.95 | 0.95 | 0.95 |
| 49 | 56.70 | 10.43 | 7.32 | 2.74 | 10.23 | 2.98 | 13.21 | 0.46 | 0.91 | 2.74 | 0.91 | 2.74 | 0.91 |
| 50 | 56.70 | 10.43 | 7.32 | 2.74 | 10.23 | 2.98 | 13.21 | 0.46 | 0.91 | 0.91 | 2.74 | 2.74 | 0.91 |
| 51 | 55.18 | 10.15 | 7.12 | 2.67 | 9.96 | 2.90 | 12.86 | 1.34 | 2.67 | 0.89 | 2.67 | 2.67 | 0.89 |
| 52 | 55.18 | 10.15 | 7.12 | 2.67 | 9.96 | 2.90 | 12.86 | 1.34 | 2.67 | 2.67 | 0.89 | 2.67 | 0.89 |
| 53 | 54.70 | 10.06 | 7.06 | 2.65 | 9.87 | 2.87 | 12.75 | 0.44 | 2.65 | 2.65 | 0.88 | 2.65 | 2.65 |
| 54 | 56.70 | 10.43 | 7.32 | 2.74 | 10.23 | 2.98 | 13.21 | 0.46 | 0.91 | 0.91 | 2.74 | 2.74 | 0.91 |
| 55 | 55.18 | 10.15 | 7.12 | 2.67 | 9.96 | 2.90 | 12.86 | 1.34 | 0.89 | 0.89 | 2.67 | 2.67 | 2.67 |
| 56 | 55.18 | 10.15 | 7.12 | 2.67 | 9.96 | 2.90 | 12.86 | 1.34 | 0.89 | 2.67 | 2.67 | 2.67 | 0.89 |
| 57 | 56.70 | 10.43 | 7.32 | 2.74 | 10.23 | 2.98 | 13.21 | 0.46 | 0.91 | 2.74 | 0.91 | 0.91 | 2.74 |
| 58 | 57.22 | 10.52 | 7.38 | 2.77 | 10.33 | 3.01 | 13.34 | 1.38 | 2.77 | 0.92 | 0.92 | 0.92 | 0.92 |
| 59 | 55.18 | 10.15 | 7.12 | 2.67 | 9.96 | 2.90 | 12.86 | 1.34 | 2.67 | 0.89 | 2.67 | 0.89 | 2.67 |
| 60 | 56.70 | 10.43 | 7.32 | 2.74 | 10.23 | 2.98 | 13.21 | 0.46 | 0.91 | 0.91 | 0.91 | 2.74 | 2.74 |
| 61 | 57.22 | 10.52 | 7.38 | 2.77 | 10.33 | 3.01 | 13.34 | 1.38 | 0.92 | 0.92 | 2.77 | 0.92 | 0.92 |
| 62 | 55.18 | 10.15 | 7.12 | 2.67 | 9.96 | 2.90 | 12.86 | 1.34 | 2.67 | 2.67 | 2.67 | 0.89 | 0.89 |
| 63 | 56.70 | 10.43 | 7.32 | 2.74 | 10.23 | 2.98 | 13.21 | 0.46 | 2.74 | 2.74 | 0.91 | 0.91 | 0.91 |
| 64 | 54.70 | 10.06 | 7.06 | 2.65 | 9.87 | 2.87 | 12.75 | 0.44 | 0.88 | 2.65 | 2.65 | 2.65 | 2.65 |
| 65 | 57.22 | 10.52 | 7.38 | 2.77 | 10.33 | 3.01 | 13.34 | 1.38 | 0.92 | 0.92 | 0.92 | 0.92 | 2.77 |
| 66 | 55.18 | 10.15 | 7.12 | 2.67 | 9.96 | 2.90 | 12.86 | 1.34 | 0.89 | 2.67 | 0.89 | 2.67 | 2.67 |
| 67 | 54.70 | 10.06 | 7.06 | 2.65 | 9.87 | 2.87 | 12.75 | 0.44 | 2.65 | 2.65 | 2.65 | 2.65 | 0.88 |
| 68 | 56.70 | 10.43 | 7.32 | 2.74 | 10.23 | 2.98 | 13.21 | 0.46 | 2.74 | 0.91 | 0.91 | 0.91 | 2.74 |
| 69 | 55.18 | 10.15 | 7.12 | 2.67 | 9.96 | 2.90 | 12.86 | 1.34 | 2.67 | 2.67 | 0.89 | 0.89 | 2.67 |
| 70 | 57.22 | 10.52 | 7.38 | 2.77 | 10.33 | 3.01 | 13.34 | 1.38 | 0.92 | 0.92 | 0.92 | 2.77 | 0.92 |
| 71 | 56.70 | 10.43 | 7.32 | 2.74 | 10.23 | 2.98 | 13.21 | 0.46 | 0.91 | 2.74 | 2.74 | 0.91 | 0.91 |

I. Melt Properties

The melt properties of several glass compositions of Examples 1 through 71 were investigated. Investigation of the melt properties of glass compositions of the present B to locate the platinum ball (2) in the center of the melt. The distance between the platinum ball (2) and the walls of the crucible (3) was 13-15 mm. If the distance were smaller, it would affect the precision of the measurement.

The movement of the platinum ball (3) in the melt was performed by changing the weight of the rider. The speed of the movement of the ball in the melt was defined in relative numbers of the balance indicator shift that was observed on the balance scale. When the balance indicator moved 100 points to both sides from zero position, the ball in the melt shifted 1.7 mm from the central position up and down. The sensitivity of the balance was 10 mg per 100 points. A Pt/PtRh thermocouple was placed in the furnace next to the crucible (3) and provided automatic temperature control of the furnace. The hot end of another thermocouple (5) was inside the crucible (10) filled with $Al_2O_3$ powder. This thermocouple was connected with the potentiometer to control the furnace temperature at the set point. The temperature control had a precision ±1.5° C.

During the testing, the platinum ball (2) moved from a marked upper position in the melt to a lower marked position under its gravity, the time of which was recorded using a stopwatch with the precision within 0.1 second. The time of the balance scale shift to 20-60 scale divisions was measured depending on the viscosity of the melt. The speed of the platinum ball (2) movement (per scale division/seconds) was taken as an average value of six measurements.

Using the velocity (V)-weight (G) data, a plot of V-G was constructed for each glass composition under investigation, all of which showed straight lines passing through the point of origin of the V-G coordinates. The slope k of each line was correlated with melt viscosity in a form of:

$$\log \eta = a^* \log(tgk) + b$$

where a (1.09) and b (0.87) were constants determined from cell calibration using a NIST standard glass (710A). The relative error in defining viscosity was within 3% over the viscosity range, $2.5 < \log \eta < 3.5$, and within 4-6% over the range, $\log \eta < 2.5$ and $\log \eta > 3.5$.

Figure 3:
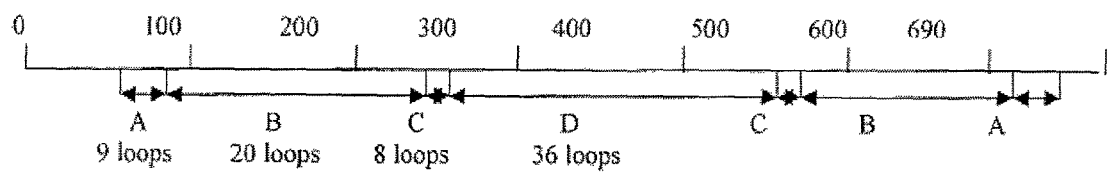
FIG. 3 illustrates the position of the thermocouple and the number of turns of the heating coil of a furnace used in the determination of liquidus temperatures ($T_L$) of glass compositions according to embodiments of the present invention.

The measurement of glass composition liquidus temperature ($T_L$) was conducted in a tube type gradient furnace with maximum temperature 1250° C. The furnace chamber had a dimension of 480 mm in length and 50 mm in diameter. The geometry and dimension of the furnace were close to those recommended by the ASTM C829-81. FIG. 3 illustrates the position of the thermocouple and the number of turns of the heating coil. The coil was made of NiCr resistance alloy wires with diameter of 2 mm.

Table VII summarizes measured liquidus temperature ($T_L$) and reference temperature of forming ($T_F$) defined by melt viscosity of 1000 Poise for glass compositions of Examples 1-22. Glass compositions of Examples 1-6 demonstrated liquidus temperatures greater than 1240° C., the upper limit of the gradient temperature furnace setting. As a result, no viscosity measurements were made for these compositions for a determination of forming temperature. Moreover, several glass compositions displayed desirable melt properties by having lower liquidus and forming temperatures while maintaining a difference in liquidus temperature and forming temperature of at least 65° C. Examples 18, 20 and 21 each provided a forming temperature under 1222° C. while maintaining a difference in liquidus and forming temperature of at least 75° C.

TABLE VII

Melt Properties of Glass Compositions

| Example | $T_L$ (° C.) | $T_F$ (° C.) | Delta T ($T_F - T_L$) (° C.) |
|---|---|---|---|
| 1 | 1235 | 1226 | −9 |
| 2 | >1240 | | |
| 3 | >1240 | | |

TABLE VII-continued

Melt Properties of Glass Compositions

| Example | $T_L$ (° C.) | $T_F$ (° C.) | Delta T ($T_F - T_L$) (° C.) |
|---|---|---|---|
| 4 | >1240 | | |
| 5 | >1240 | | |
| 6 | >1240 | | |
| 7 | | 1296 | |
| 8 | 1190 | 1265 | 75 |
| 9 | | 1290 | |
| 10 | 1185 | 1246 | 61 |
| 11 | 1190 | 1236 | 46 |
| 12 | 1130 | 1265 | 135 |
| 13 | 1185 | 1224 | 39 |
| 14 | 1155 | 1248 | 93 |
| 15 | 1085 | 1250 | 165 |
| 16 | 1170 | 1225 | 55 |
| 17 | 1180 | 1204 | 24 |
| 18 | 1135 | 1222 | 87 |
| 19 | 1090 | 1252 | 162 |
| 20 | 1140 | 1220 | 80 |
| 21 | 1130 | 1205 | 75 |
| 22 | 1120 | 1262 | 142 |

Table VIII summarizes measured liquidus temperature ($T_L$) and the forming ($T_F$) temperature for glass compositions of Examples 40 through 71 as a function of weight percent of $Li_2O$ in the glass compositions. As provided in Table VIII, $Li_2O$ plays a significant role in lowering the liquidus and forming temperatures of glass compositions of the present invention with minimum reductions in forming and liquidus temperatures being 30° C. and 43° C. respectively.

TABLE VIII

Melt Properties of Glass Compositions

| | High $Li_2O$ (1.5 wt %) | | | Low $Li_2O$ (0.5 wt %) | | |
|---|---|---|---|---|---|---|
| EX. | $T_F$ ° C. | $T_L$ ° C. | Delta T ° C. | EX. | $T_F$ ° C. | $T_L$ ° C. | Delta T ° C. |
| 42 | 1148 | 1060 | 88 | 40 | 1187 | 1100 | 87 |
| 44 | 1156 | 1054 | 102 | 41 | 1176 | 1073 | 103 |
| 45 | 1157 | 1065 | 92 | 43 | 1165 | 1083 | 82 |
| 47 | 1145 | 1058 | 87 | 46 | 1179 | 1081 | 98 |
| 51 | 1142 | 1067 | 82 | 48 | 1210 | 1096 | 114 |
| 52 | 1158 | 1054 | 104 | 49 | 1210 | 1098 | 112 |
| 55 | 1154 | 1031 | 123 | 50 | 1206 | 1086 | 120 |
| 56 | 1160 | 1024 | 136 | 53 | 1193 | 1084 | 109 |
| 58 | 1164 | 1062 | 102 | 54 | 1205 | 1090 | 115 |
| 59 | 1124 | 1054 | 70 | 57 | 1222 | 1074 | 148 |
| 61 | 1160 | 1054 | 106 | 60 | 1204 | 1087 | 117 |
| 62 | 1148 | 1043 | 105 | 63 | 1215 | 1068 | 147 |
| 65 | 1163 | 1065 | 98 | 64 | 1192 | 1073 | 119 |
| 66 | 1162 | 1057 | 105 | 67 | 1190 | 1073 | 117 |
| 69 | 1154 | 1060 | 94 | 68 | 1190 | 1087 | 103 |
| 70 | 1158 | 1060 | 98 | 71 | 1208 | 1073 | 135 |

Figure 4:
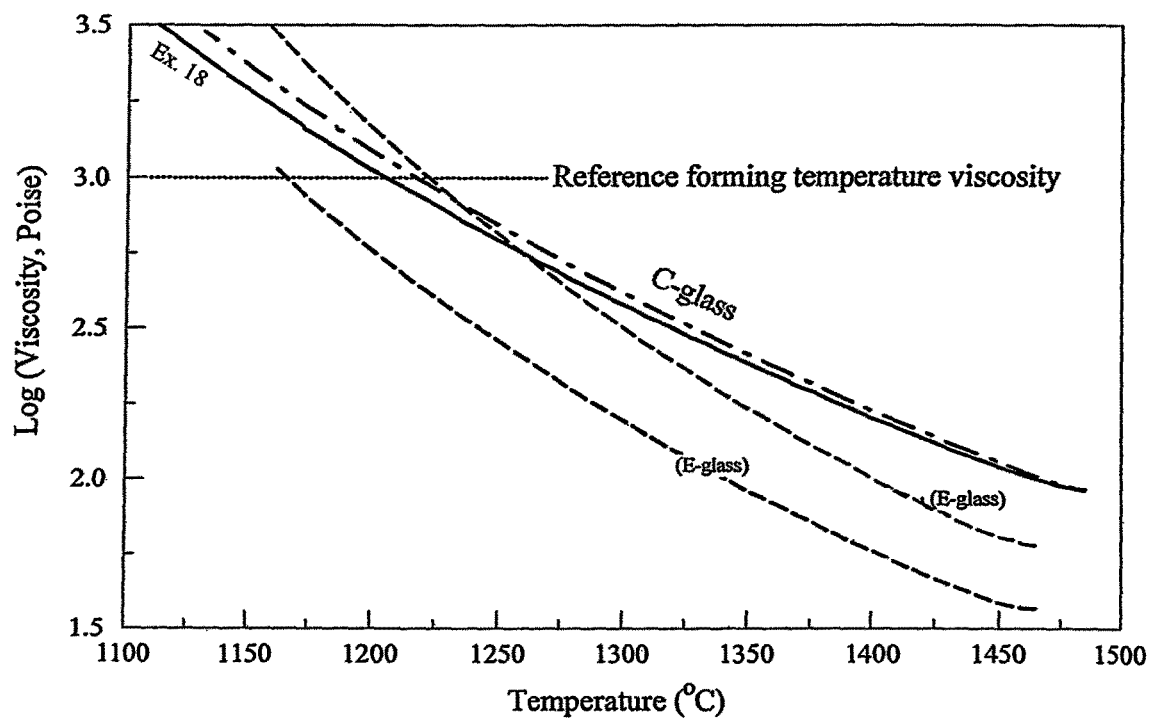
FIG. 4 provides temperature-viscosity curves for a glass composition according to one embodiment of the present invention, two commercially available E-glass compositions and a C-glass composition.

FIG. 4 provides temperature-viscosity curves for the glass composition of Example 18, two E-glass compositions and a C-glass composition. From FIG. 4, it is noted that the temperature-viscosity characteristics of the glass composition of Example 18 are similar to those of the C-glass composition. Moreover, the viscosity change for the glass composition of Example 18 is not as steep as that provided for the E-glass compositions. As a result, the glass composition of Example 18 can be characterized as a "long" glass whereas the E-glass compositions are "short" glasses. Longer glasses, such as Example 18, in principle, favor fine filament production forming due to less forming tension as a result of slower reduction in melt viscosity over the forming temperature range right after fiber exit from the forming tip.

Figure 5:
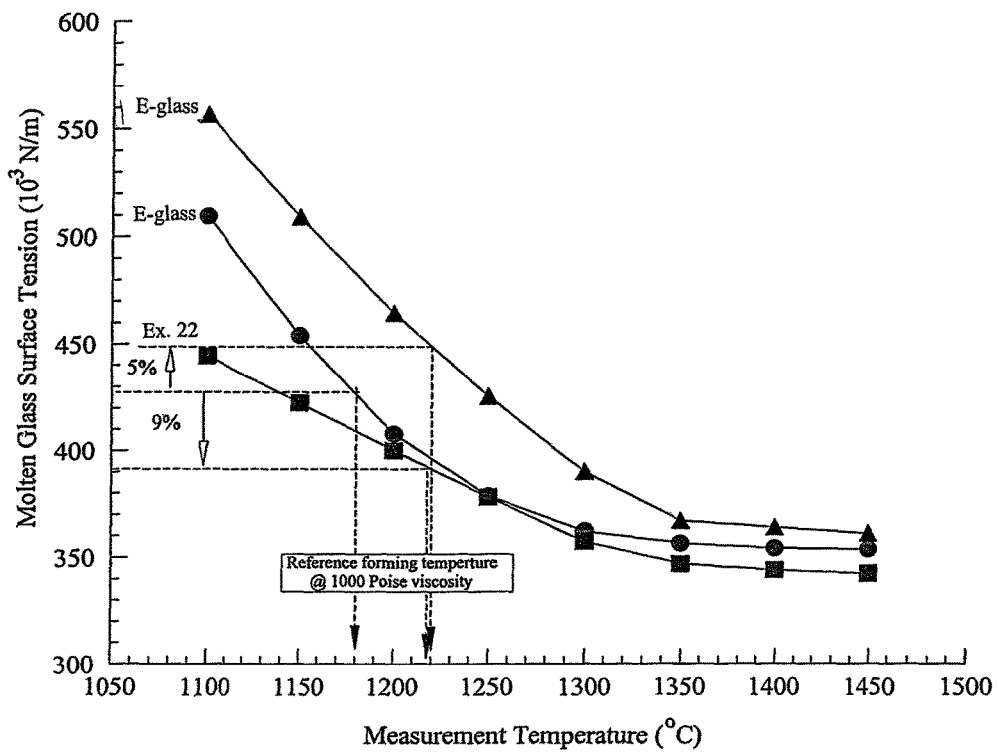
FIG. 5 provides molten glass surface tensions as a function of temperature for a glass composition according to one embodiment of the present invention and two commercially available E-glass compositions.

FIG. 5 further illustrates the reduction in forming tension by providing molten glass surface tensions as a function of temperature for the glass composition of Example 22 in comparison two E-glass compositions. As provided in FIG. 5, the glass composition of Example 22 at the forming temperature has 9% and 14% lower surface tension than the E-glass compositions.

Figure 6:
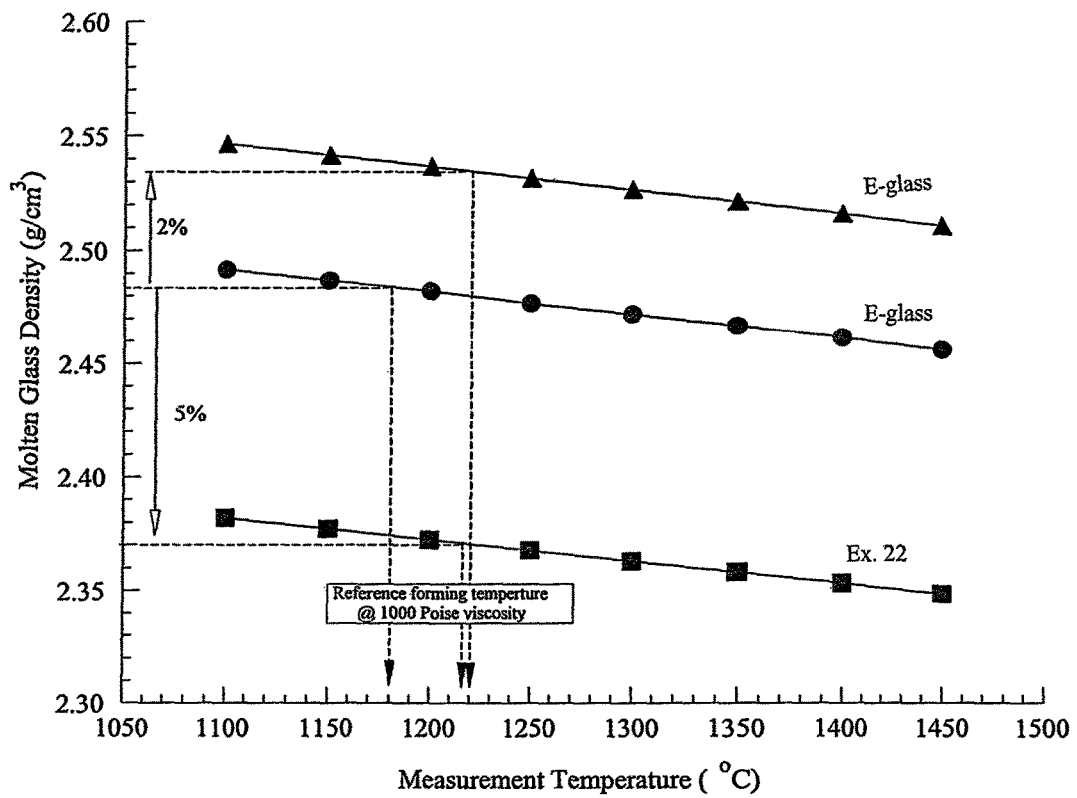
FIG. 6 is a plot of the melt or molten glass density as a function of temperature for a glass composition according to one embodiment of the present invention and two commercially available E-glass compositions.

FIG. 6 is a plot of the melt or molten glass density as a function of temperature for the glass composition of Example 22 in comparison with two E-glass compositions. As provided in FIG. 6, the glass composition of Example 22 demonstrated a temperature dependency (slope) similar to the E-glass compositions but had a molten density 5% and 7% lower than the E-glass compositions respectively. As a result, glass fibers formed from some glass compositions of the present invention are lighter per unit volume in comparison to some E-glass fibers. Lighter glass fibers can be advantageous in many applications, particularly material reinforcement application, such as polymeric reinforcement applications, where weight savings are highly desirable. Moreover, as a result of lower densities, glass fibers formed from some glass compositions of the present invention can have larger diameters in comparison to some E-glass fibers of the same weight, thereby providing enhanced mechanical properties.

Figure 7:
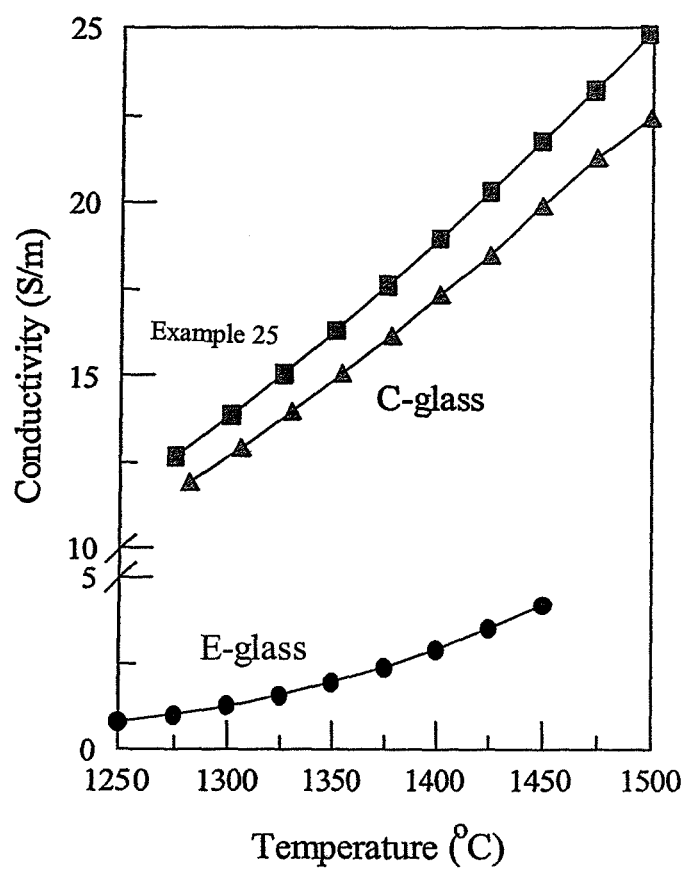
FIG. 7 is a plot electrical of conductivity as a function of temperature for a glass composition according to one embodiment of the present invention as well as E-glass and C-glass compositions.

FIG. 7 is a plot electrical of conductivity as a function of temperature for the glass composition of Example 25 in comparison with E-glass and C-glass compositions. As provided in FIG. 7, the glass composition of Example 25 and the C-glass composition display much higher electrical conductivities than the E-glass due to their significantly higher alkali metal content. The melt conductivity of an inorganic glass composition is generally dominated by the mobile ions of sodium and potassium. As a result of low sodium and potassium ion content in E-glass compositions, electrical melting technology is only used as a secondary boost system for E-glass processing. However, electrical melting technology has been used as a primary energy for the processing of C-glass compositions. Given that glass compositions of the present invention, in some embodiments, demonstrate higher melt conductivities than some C-glass compositions, electrical melting technology may find application to processing glass compositions of the present invention.

Figure 8:
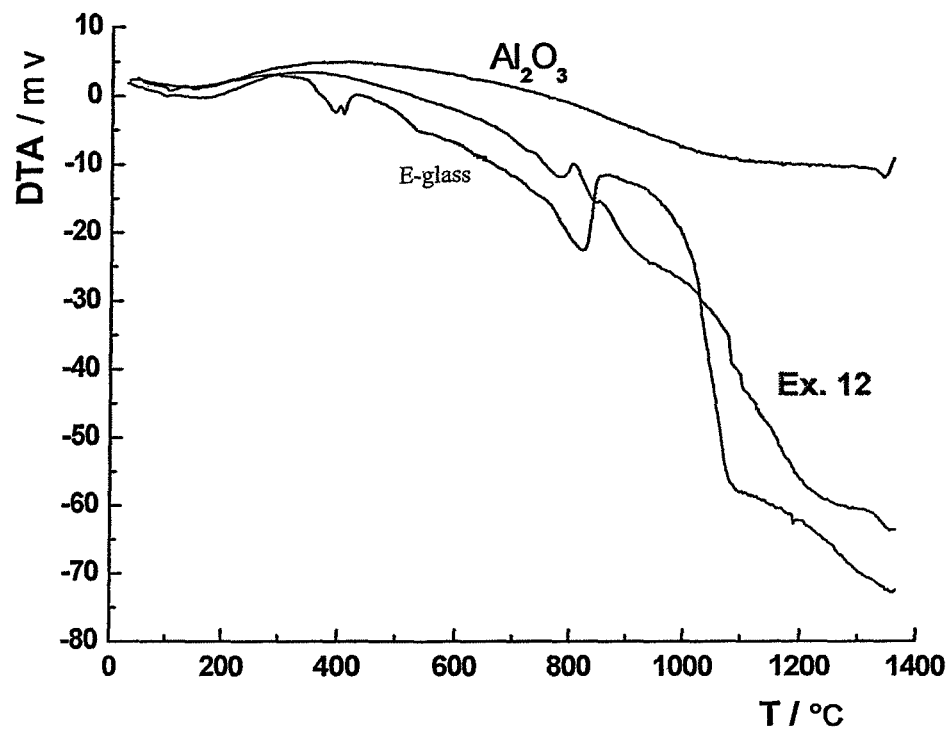
FIG. 8 provides energy requirements for conversion of several batch compositions to glass melt compositions according to one embodiment of the present invention.

Additionally, glass compositions of the present invention formed from batch compositions comprising perlite and/or pumice, in some embodiments, require less energy for converting the batch composition to a glass melt composition. FIG. 8 provides the energy required to convert the batch composition comprising perlite to the glass melt composition of Example 12. FIG. 8 also provides the energy required to convert an E-glass batch composition to the associated glass melt. As shown in FIG. 8, the energy required to convert the batch composition of Example 12 into a glass melt composition was 20% less than the energy required to convert the E-glass batch composition to glass melt composition. The energy required to convert a second E-glass batch composition to a glass melt composition was also compared with the energy required to convert the batch composition of Example 12 into a glass melt composition. The energy required to convert the batch composition of Example 12 was about 33% percent lower than the energy to convert the second E-glass batch composition to a glass melt composition.

II. Acid and Alkaline Corrosion Resistance

Fibers formed from glass compositions of the present invention were made in a laboratory using a single tip bushing set up. To compare with commercial glass fiber corrosion resistance under the same testing conditions, AR-, C-, ECR- and E-glass fibers were also made using the same method using cullet.

Glass fiber resistance to corrosion was evaluated in terms of the relative sample percent weight loss after leaching test. Testing was administered by boiling a fiber strand at 100° C. for one hour in sulfuric acid or sodium hydroxide solutions under various pH conditions. All of the tests were performed by keeping ratio of solution volume to the sample mass or volume (5,000 m$^2$) constant. 50 ml of the solution and of 1.375 gram (filament diameter—22 μm) were used for each test. Triplicate samples were tested to determine average sample weight losses. The results of the acid and alkaline corrosion resistance testing are provided in Table IX.

TABLE IX

Acid and Alkaline Corrosion Resistance Results (% Weight Loss)

| pH | 0<br>1N<br>H$_2$SO$_4$ | 2<br>0.1N<br>H$_2$SO$_4$ | 12<br>0.1N<br>NaOH | 14<br>1N<br>NaOH | Note |
|---|---|---|---|---|---|
| E-glass (1) | 1.02 | 0.19 | 0.29 | 1.24 | 0 B$_2$O$_3$ |
| E-glass (2) | 1.04 | 0.00 | 0.51 | 0.92 | 1.3 B$_2$O$_3$ |
| E-glass (3) | 17.79 | | 0.87 | 1.62 | 6.0 B$_2$O$_3$ |
| ECR | 0.66 | 0.00 | 0.13 | 1.11 | 0 B$_2$O$_3$ + 4 ZnO |
| C-Glass$^2$ | 0.09 | 0.13 | 0.36 | 7.83 | 0 B$_2$O$_3$ |
| AR-Glass I$^3$ | 0.10 | 0.00 | 0.00 | 0.10 | 17 ZrO$_2$ |
| Ex 10 | 1.12 | 0.21 | 0.84 | 6.42 | Baseline |
| Ex 11 | 3.58 | 0.15 | 0.38 | 5.60 | 1% ZrO$_2$ + 3% TiO$_2$ |
| Ex 12 | 4.38 | 0.21 | 0.62 | 2.23 | 2.9 ZrO$_2$ + 1.1% |
| Ex 13 | 4.79 | 0.64 | 0.40 | 1.01 | TiO$_2$<br>8% ZrO$_2$ |
| Ex 12 | 0.59 | 0.22 | 0.26 | 8.13 | baseline |
| Ex 38 | 1.50 | 0.09 | 0.68 | 11.02 | |
| Ex 18 | 3.10 | | | | |
| Ex 19 | 0.69 | 0.66 | 0.31 | 8.47 | |
| Ex 57 | 2.20 | | | 2.29 | |
| Ex 58 | 2.75 | | | 3.81 | |
| Ex 59 | 5.35 | | | 5.54 | |
| Ex 63 | 1.64 | | | 2.89 | |
| Ex 67 | 1.35 | | | 3.57 | |
| Ex 71 | 1.19 | | | 3.30 | |

$^1$The average determined from three individual tests and standard deviation is not greater than 0.1%.
$^2$C-glass (wt %): 66 SiO$_2$, 5.5 Al$_2$O$_3$, 10.4 CaO, 3.6 MgO, 0.3 Fe$_2$O$_3$, 0.2 K$_2$O, 12.5 Na$_2$O, 0.5F and 0.2 SO$_3$.
$^3$AR-glass (wt %): 57 SiO$_2$, 3.2 Al$_2$O$_3$, 15 ZrO$_2$, 4.2 CaO, 0.1 MgO, 0.1 Fe$_2$O$_3$, 0.1 K$_2$O, 12 Na$_2$O, 0.5 F and 0.23 SO$_3$.

III. Mechanical Testing

Figure 9:
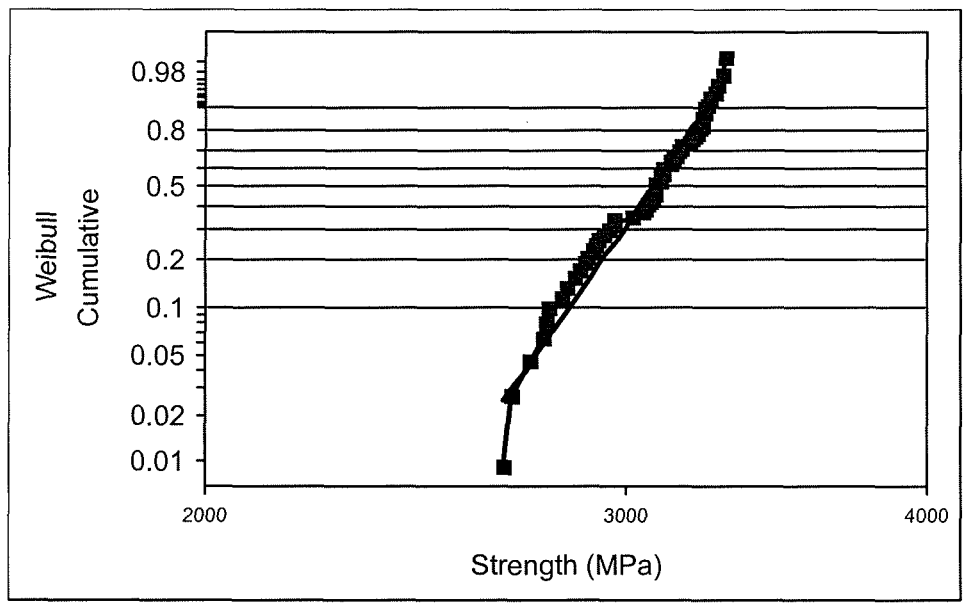
FIG. 9 summarizes Weibull statistical analysis of fiber strengths of various glass compositions according to some embodiments of the present invention.

Tensile strengths of fibers formed from the glass composition of Example 37 of the present invention were measured by drawing 10-um diameter fibers from single tip bushing in laboratory. The fibers were subsequently tested by applying tensile force to the fibers from both ends within the same day of fiber forming. FIG. 9 summarizes Weibull statistical analysis of the fiber strength with an average of about 3050 MPa and standard error of 22.4 MPa for sample size of 57. Except for the tail, the strength fit the single Weibull distribution well suggesting a single failure mode dominates the fiber failure.

Fiber sonic tensile modulus was measured by drawing 30-um diameter fibers comprising the glass composition of Example 37 of the present invention from a single tip bushing in laboratory. The fibers were subsequently tested by applying dead weight from both ends to measure velocity of sound traveling inside the fiber. Fiber density was also measured. The elastic modulus was calculated using $E=\rho C^2$ where E, ρ, and C are modulus, density, and sound velocity, respectively. Fibers of two sets were formed at two different temperatures, the first set at 1000 Poise melt viscosity (Low T Forming) and the second set at 50° C. higher than the first set. (High T Forming) Table X summarizes the statistical analysis of the fiber modulus with an average of about 56.8 GPa and 61.5 GPa for low and high forming temperature cases, respectively.

TABLE X

Tensile Modulus

| Statistics | Low T Forming | High T Forming |
|---|---|---|
| Mean (GPa) | 56.79 | 61.47 |
| Std Dev (GPa) | 4.41 | 6.73 |
| Std Err Mean (GPa) | 0.99 | 1.37 |
| upper 95% Mean | 58.86 | 64.31 |
| lower 95% Mean | 54.73 | 58.62 |
| Sample Size N | 20 | 24 |
| Fiber Diameter (μm) | 29.96 ± 0.36 | 30.17 ± 0.42 |
| Fiber Density (g/cm$^3$) | 2.356 ± 0.006 | 2.251 ± 0.028 |

Desirable characteristics, which can be exhibited by embodiments of the present invention, can include, but are not limited to, the provision of new glass compositions that utilize glassy minerals; the provision of new glass compositions that utilize perlite; the provision of batch compositions requiring less energy to form melts of glass compositions; the provision of new glass compositions demonstrating significant differences in liquidus and forming temperatures; the provision of glass fibers having reduced weights without a concomitant reduction in mechanical properties; and the provision of glass fibers demonstrating desirable acid and alkaline corrosion resistance properties.

It is to be understood that the present description illustrates aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, the present invention is not limited to the particular embodiments disclosed, but is intended to cover modifications that are within the spirit and scope of the invention, as defined by the appended claims.

That which is claimed:

1. A method of producing a glass composition comprising:
   providing a batch composition comprising dolomite, at least 50 weight percent of a glassy mineral, and at least 5 weight percent of a sodium source, the glassy mineral comprising a combination of SiO$_2$ and Al$_2$O$_3$ in an amount of at least 80 weight percent; and
   heating the batch to form a melt of the glass composition, wherein the glass composition comprises:
   8 to less than 12 weight percent Al$_2$O$_3$;
   less than 1 weight percent of Fe$_2$O$_3$;
   8.5 to 16 weight percent Na$_2$O;
   2 to 4 weight percent K$_2$O;
   0-3 weight percent La$_2$O$_3$;
   from greater than 0 to 3 weight percent MnO$_2$; and
   0-3 weight percent ZrO$_2$;
   wherein the glass composition is substantially free of B$_2$O$_3$ and SrO.

2. The method of claim 1, wherein the batch composition is heated to a fiber forming temperature ranging from about 1120° C. to about 1300° C.

3. The method of claim 2, further comprising fiberizing the glass composition.

4. The method of claim 1, wherein the batch composition comprises at least 65 weight percent of a glassy mineral.

5. The method of claim 1, wherein the glassy mineral comprises perlite, pumice, or mixtures thereof.

6. The method of claim 1, wherein the batch composition comprises at least 10 weight percent of a sodium source.

7. The method of claim 1, wherein the sodium source comprises sodium carbonate (soda).

8. The method of claim 1, wherein the batch composition comprises limestone in an amount up to 17 weight percent.

9. The method of claim 1, wherein the batch composition comprises dolomite in an amount up to 13 weight percent.

10. The method of claim 1, wherein the batch composition is heated to a fiber forming temperature ranging from about 1400° C. to about 1450° C.

11. The method of claim 1, wherein the batch composition is heated to a fiber forming temperature which differs from the liquidus temperature of a glass composition from about 45° C. to about 165° C.

12. The method of claim 1, wherein the batch composition is heated to a fiber forming temperature which differs from the liquidus temperature by at least 65° C.

13. A method of producing a glass composition comprising:
   providing a batch composition comprising dolomite, at least 50 weight percent of a glassy mineral, and at least 5 weight percent of a sodium source, the glassy mineral comprising a combination of SiO$_2$ and Al$_2$O$_3$ in an amount of at least 80 weight percent; and
   heating the batch to form a melt of the glass composition, wherein the glass composition comprises:
   53-64 weight percent SiO$_2$;
   9 to less than 12 weight percent Al$_2$O$_3$;
   0-3 weight percent ZrO$_2$;
   0-3 weight percent La$_2$O$_3$;
   from greater than 0 to 3 weight percent MnO$_2$;
   10.5-18 weight percent alkali oxide component (R$_2$O), wherein the alkali oxide component comprises Na$_2$O in an amount ranging from 8.5 to 16 weight percent and K$_2$O in an amount ranging from 2 to 4 weight percent; and
   a metal oxide (RO) component selected from the group consisting of MgO, CaO, BaO, and ZnO, wherein the metal oxide component is present in an amount to provide a ratio R$_2$O/RO ranging from about 0.15 to about 1.5, wherein the glass composition comprises less than 1 weight percent of Fe$_2$O$_3$ and is substantially free of B$_2$O$_3$ and SrO.

14. A method of producing a glass composition comprising:
   providing a batch composition comprising dolomite, at least 50 weight percent of a glassy mineral, and at least 5 weight percent of a sodium source, the glassy mineral comprising a combination of SiO$_2$ and Al$_2$O$_3$ in an amount of at least 80 weight percent; and
   heating the batch to form a melt of the glass composition, wherein the glass composition comprises:
   56-63 weight percent SiO$_2$;
   9 to less than 12 weight percent Al$_2$O$_3$;
   12-17 weight percent RO (CaO+MgO);

12-14 weight percent $R_2O$ ($Na_2O+K_2O$);
0-2 weight percent $Li_2O$;
0-3 weight percent ZnO;
0-3 weight percent $ZrO_2$;
from greater than 0 to 3 weight percent $MnO_2$; and
0-3 weight percent $La_2O_3$,
wherein the glass composition is substantially free $B_2O_3$ and SrO.

15. A method of producing a glass composition comprising:
    providing a batch composition comprising dolomite, at least 50 weight percent of a glassy mineral, and at least 5 weight percent of a sodium source, the glassy mineral comprising a combination of $SiO_2$ and $Al_2O_3$ in an amount of at least 80 weight percent; and
    heating the batch to form a melt of the glass composition, wherein the glass composition comprises:
    60-64 weight percent $SiO_2$;
    9 to less than 12 weight percent $Al_2O_3$;
    7-15 weight percent RO (CaO+MgO);
    13-15.5 weight percent $R_2O$ ($Na_2O+K_2O$);
    0-2 weight percent $Li_2O$;
    0-3 weight percent ZnO;
    0-3 weight percent $ZrO_2$;
    from greater than 0 to 3 weight percent $MnO_2$; and
    0-3 weight percent $La_2O_3$,
wherein the glass composition is substantially free of $B_2O_3$ and SrO.

16. A method of producing a glass composition comprising:
    providing a batch composition comprising dolomite, at least 50 weight percent of a glassy mineral, and at least 5 weight percent of a sodium source, the glassy mineral comprising a combination of $SiO_2$ and $Al_2O_3$ in an amount of at least 80 weight percent; and
    heating the batch to form a melt of the glass composition, wherein the glass composition comprises:
    from greater than 60 to 64 weight percent $SiO_2$;
    9-14 weight percent $Al_2O_3$;
    0-3 weight percent $ZrO_2$;
    0-3 weight percent $La_2O_3$;
    from greater than 0 to 3 weight percent $MnO_2$;
    less than 1 weight percent of $Fe_2O_3$;
    10.5-18 weight percent alkali oxide component ($R_2O$), wherein the alkali oxide component comprises $Na_2O$ in an amount ranging from 8.5 to 16 weight percent and $K_2O$ in an amount ranging from 2 to 4 weight percent; and
    a metal oxide (RO) component selected from the group consisting of MgO, CaO, BaO, and ZnO, wherein the metal oxide component is present in an amount to provide a ratio of $R_2O$/RO ranging from about 0.15 to about 1.5;
wherein the glass composition is substantially free of $B_2O_3$ and SrO.

* * * * *